(12) United States Patent
Miyazaki et al.

(10) Patent No.: US 8,473,675 B2
(45) Date of Patent: Jun. 25, 2013

(54) MEMORY SYSTEM AND INFORMATION PROCESSING DEVICE

(75) Inventors: Sadao Miyazaki, Kawasaki (JP); Osamu Ishibashi, Kawasaki (JP); Rikizo Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 12/805,098

(22) Filed: Jul. 12, 2010

(65) Prior Publication Data

US 2011/0010508 A1 Jan. 13, 2011

(30) Foreign Application Priority Data

Jul. 13, 2009 (JP) ................................ 2009-164839

(51) Int. Cl.
*G06F 12/00* (2006.01)
(52) U.S. Cl.
USPC .......................................................... 711/113
(58) Field of Classification Search
None
See application file for complete search history.

(56) References Cited

U.S. PATENT DOCUMENTS

| 5,530,828 | A | * | 6/1996 | Kaki et al. | 711/103 |
| 5,664,224 | A | * | 9/1997 | Davis | 710/22 |
| 5,963,474 | A | | 10/1999 | Uno et al. | |
| 7,864,184 | B2 | * | 1/2011 | Aoki | 345/537 |
| 2006/0136963 | A1 | * | 6/2006 | Oh et al. | 725/35 |
| 2007/0065122 | A1 | * | 3/2007 | Chatterton | 386/126 |
| 2010/0174871 | A1 | | 7/2010 | Uchida | |

FOREIGN PATENT DOCUMENTS

| JP | 5-150913 | 6/1993 |
| JP | 6-4399 | 1/1994 |
| JP | 2007-41813 | 2/2007 |
| KR | 10-2008-0017760 | 2/2008 |
| WO | 97/13204 | 4/1997 |
| WO | 2008/149657 A1 | 12/2008 |
| WO | 2009/084724 A1 | 7/2009 |

OTHER PUBLICATIONS

Korean Office Action for corresponding Korean Application No. 10-2010-0061190, mailed on Nov. 17, 2011.
European Search Report dated Nov. 24, 2010 in corresponding European Patent Application 10166971.1.

* cited by examiner

*Primary Examiner* — Hiep Nguyen
(74) *Attorney, Agent, or Firm* — Staas & Halsey LLP

(57) ABSTRACT

A memory system includes a first memory that is used as a main memory of a target device, a second memory that has an access speed lower than that of the first memory, a securing section that secures a predetermined area of the first memory as a temporary storage area of the second memory, and a memory control section that receives an instruction to write data into the second memory, temporarily stores the data into the first memory and also transfers the stored data from the first memory to the second memory.

15 Claims, 29 Drawing Sheets

MEMORY SYSTEM AND INFORMATION PROCESSING DEVICE

CROSS-REFERENCE TO RELATED APPLICATION

This application is based upon and claims the benefit of priority of the prior Japanese Patent Application No. 2009-164839, filed on Jul. 13, 2009, the entire contents of which are incorporated herein by reference.

FIELD

The embodiments discussed herein are directed to a memory system and an information processing device.

BACKGROUND

Recently, as a memory device that replaces a HDD (Hard Disk Drive), a so-called SSD (Solid State Drive) that uses a flash memory for a storage medium receives attention (see, for example, Japanese Laid-open Patent Publications No. H5-150913, No. H6-4399, and No. 2007-41813).

Since the SSD does not have a magnetic disk like the HDD, a time for seek operation to move a head to a desired track and a time until when a desired data position in the track to reach the head are unnecessary. Therefore, with the SSD, it is possible to perform storage and reproduction of data faster than the HDD, and thus the SSD receives attention. Further, the SSD does not need to rotate a magnetic disk by using a motor or move the head as opposed to the HDD, resulting in low power consumption, which is another reason of receiving attention.

Here, most of the SSD is provided with a DRAM (Dynamic Random Access Memory) for buffering when storing data in a flash memory. Recently, the SSD is demanded of further speedup and as a method, a capacity increase of the DRAM for buffering is considered.

On the other hand, the SSD is demanded of further power-saving. However, the DRAM has large power consumption in many cases, and the power consumption becomes larger as a capacity of the DRAM increases. Because of this, currently, achieving further speedup while saving electric power of the SSD is difficult.

Incidentally, up to here, a problem that achieving high-speed and power saving at the same time is difficult is explained by taking the SSD as ways of example. However, this problem may generally occur in a memory system that uses a storage medium having large power consumption like the DRAM as a buffer to store data.

SUMMARY

According to a first aspect of the invention, a memory system in a basic mode includes a first memory, a second memory, a securing section, and a memory control section.

The first memory is used as a main memory of a target device.

The second memory has an access speed lower than that of the first memory.

The securing section secures a predetermined area of the first memory as a temporary storage area of the second memory.

The memory control section receives an instruction to write data into the second memory, temporarily stores the data into the first memory and also transfers the stored data from the first memory to the second memory.

According to a second aspect of the invention, a memory device in a basic mode includes the second memory and a data receiving section that is described in the following.

The data receiving section is connected to the memory control section. And the data receiving section receives an input of data to be written into the second memory and transmits the inputted data to the memory control section.

According to a third aspect of the invention, a memory control device in a basic mode includes the securing section, a data input section and a data distribution section that are described in the following.

The data input section receives an input of first data and an input of second data.

The data distribution section receives, among the data inputted in the data input section, with respect to first data, an instruction to write the first data into the first memory and directly stores the first data into the first memory. Also, the data distribution section receives an instruction to write the second data into the second memory. Then, the data distribution section temporarily stores the second data into the first memory and also transfers the stored second data from the first memory to the second memory.

According to a fourth aspect of the invention, an information processing device in a basic mode includes the first memory, the second memory, the securing section, the memory control section, and a processing section that is described in the following.

The processing section accesses the first memory and the second memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereafter, concrete embodiments of a memory system, a memory device, a memory control device, and an information processing device whose basic modes are explained will be described with reference to drawings.

At first, a first embodiment will be explained.

Figure 1:
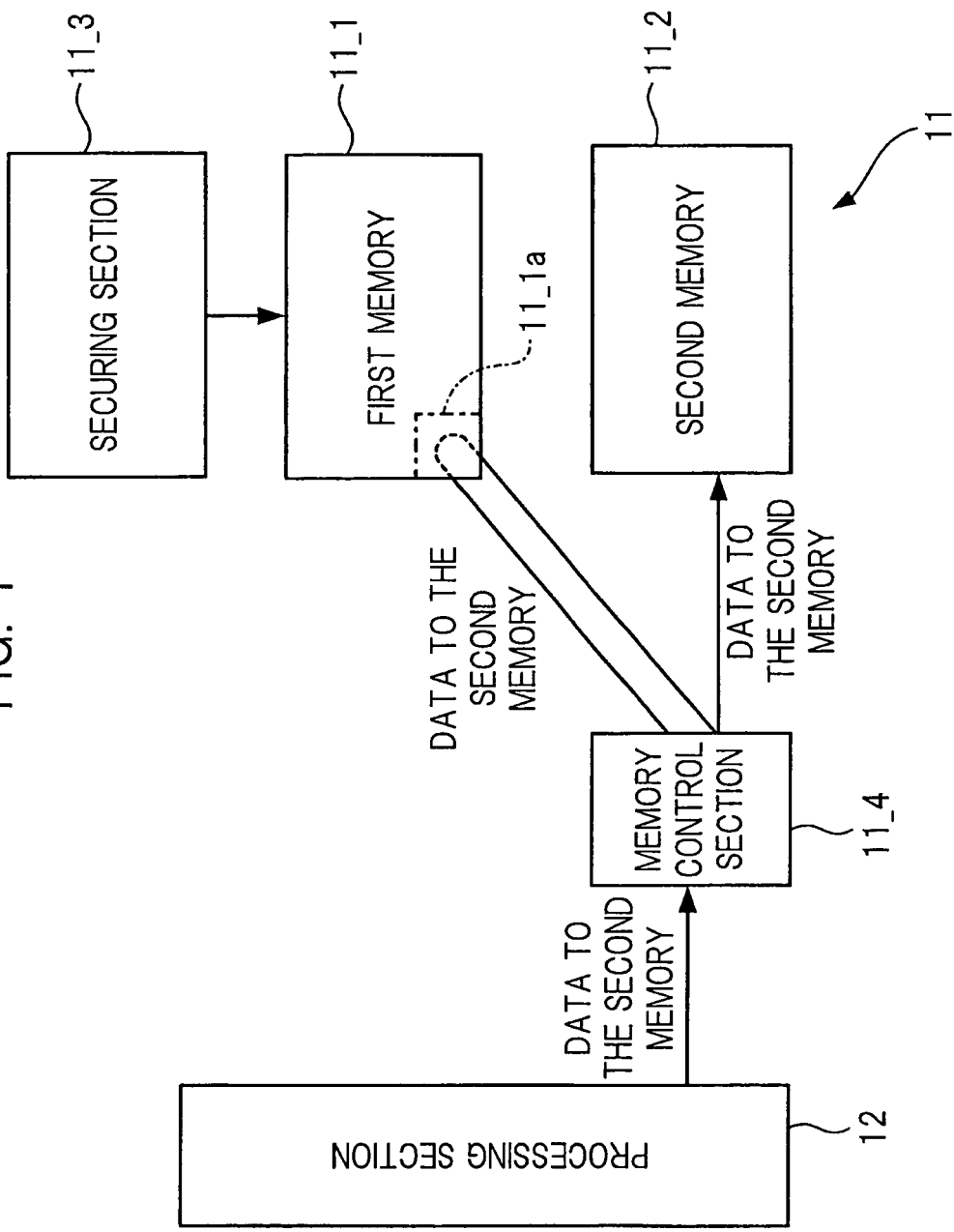
FIG. 1 is a diagram illustrating a first embodiment.

FIG. 1 is a diagram illustrating the first embodiment.

In this FIG. 1, an information processing device 10 that includes a memory system 11 and a processing section 12 is illustrated. In the first embodiment, this information processing device 10 in FIG. 1 corresponds to a concrete embodiment of the information processing device. Also in the first embodiment, the memory system 11 in FIG. 1 corresponds to a concrete embodiment of the memory system. Further in the first embodiment, the processing section 12 in FIG. 1 corresponds to an example of the processing section of the information processing device in the basic mode.

Additionally, the memory system 11 includes a first memory 11_1, a second memory 11_2, a securing section 11_3 and a memory control section 11_4. In the first embodiment, the first memory 11_1, the second memory 11_2, the securing section 11_3 and the memory control section 11_4 correspond to an example of the first memory, the second memory, the securing section and the memory control section, respectively, in the basic mode.

The first memory 11_1 is used as a main memory of a target device.

An access speed in the second memory 11_2 is slower than that in the first memory 11_1.

The securing section 11_3 secures a predetermined area 11_1a of the first memory 11_1 as a temporary storage area of the second memory 11_2.

The memory control section 11_4 receives an instruction to write data into the second memory 11_2, temporarily stores the data into the first memory 11_1 and also transfers the stored data from the first memory 11_1 to the second memory 11_2.

The processing section 12 plays a role of accessing the first memory 11_1 and the second memory 11_2.

Incidentally, although storing of data into the first memory 11_1 is not specified in this FIG. 1, it may be performed by the memory control section 11_4 or a not-illustrated constituent element other than the memory control section 11_4.

In the memory system 11 of FIG. 1, the first memory 11_1 is a memory per se that predominantly saves data, and at the same time secures a predetermined storage area 11_1a inside as a temporary storage area (buffer) of the second memory 11_2 where a speed of storing data is relatively slow. According to this configuration of the memory system 11, a buffer of the second memory 11_2 needs to have a large capacity to make an apparent storage speed of the second memory 11_2 fast. However, since the first memory 11_1 in which this buffer is secured is a dominant memory per se as described above, it is possible to secure a sufficiently large capacity without especially increasing a capacity. Moreover, since it is possible to secure a buffer of large-capacity in a memory having such a large capacity, increase of power consumption due to the speedup of the second memory 11_2 is approximately zero. That is, according to the memory system 11 of FIG. 1, it is possible to achieve speedup while saving electric power in storing data. Eventually, also in storing data in the information processing device 10 of FIG. 1 that utilizes this memory system 11 to store data handled in information processing, high-speed while saving power consumption may be realized.

Next, a second embodiment will be explained.

Figure 2:
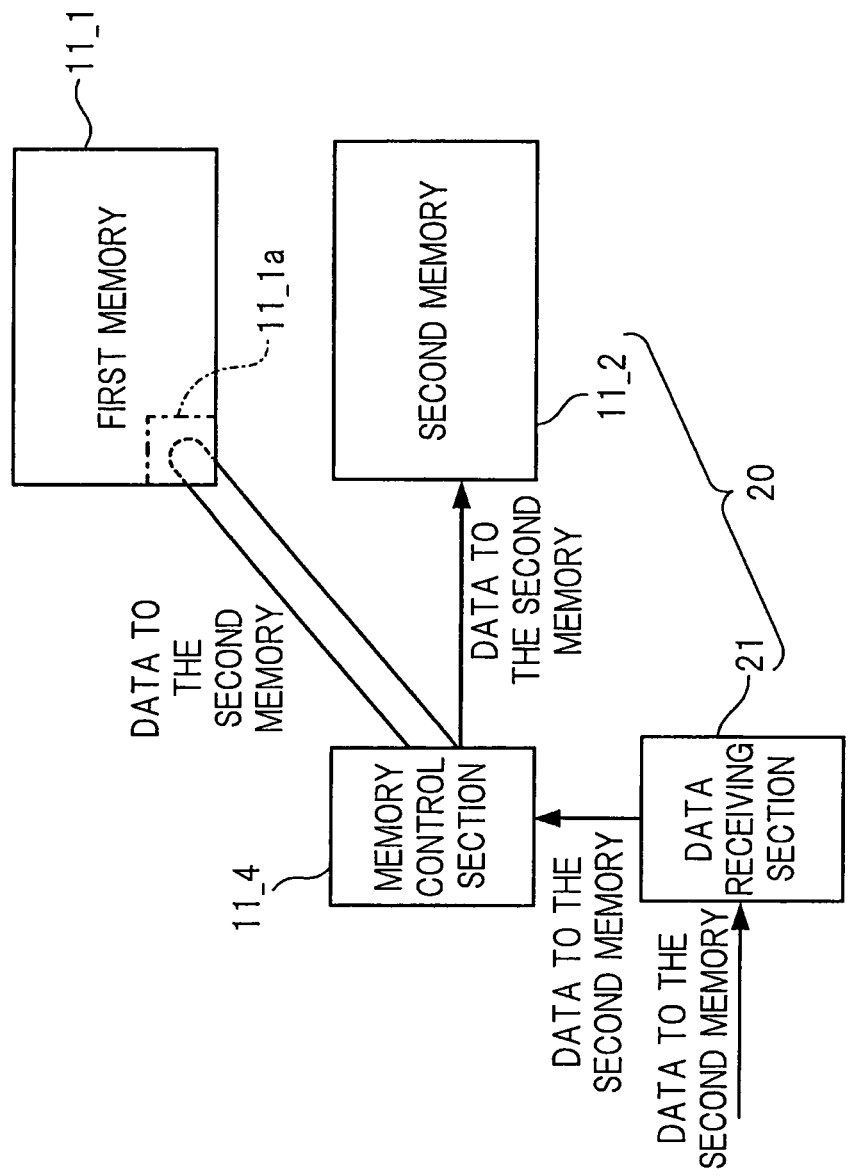
FIG. 2 is a diagram illustrating a second embodiment.

FIG. 2 is a diagram illustrating the second embodiment.

In this FIG. 2, constituent elements that are equivalent to those in FIG. 1 are referred to by the same numerals in FIG. 1 and redundant explanation of those equivalent constituent elements is omitted.

In this FIG. 2, a memory device 20 that includes the second memory 11_2 and a data receiving section 21 is illustrated. In the second embodiment, the memory device 20 of FIG. 2 corresponds to a concrete embodiment of the memory device. Also in the second embodiment, the data receiving section 21 of this FIG. 2 corresponds to an example of the data receiving section in the basic mode of the memory device.

The data receiving section 21 is connected to the memory control section 11_4. The receiving section 21 receives input of data to be written into the second memory 11_2, and transmits the inputted data to the memory control section 11_4.

According to the memory device 20 of this FIG. 2, the first memory 11_1 that is a predominant memory outside the memory device 20 is utilized as a buffer of the second memory 11_2 within the memory device 20. That is, according to the memory device 20, the above-described memory system 11 of FIG. 1 may be easily realized, and eventually high-speed while saving power consumption may be realized in storing data.

Next, a third embodiment will be explained.

Figure 3:
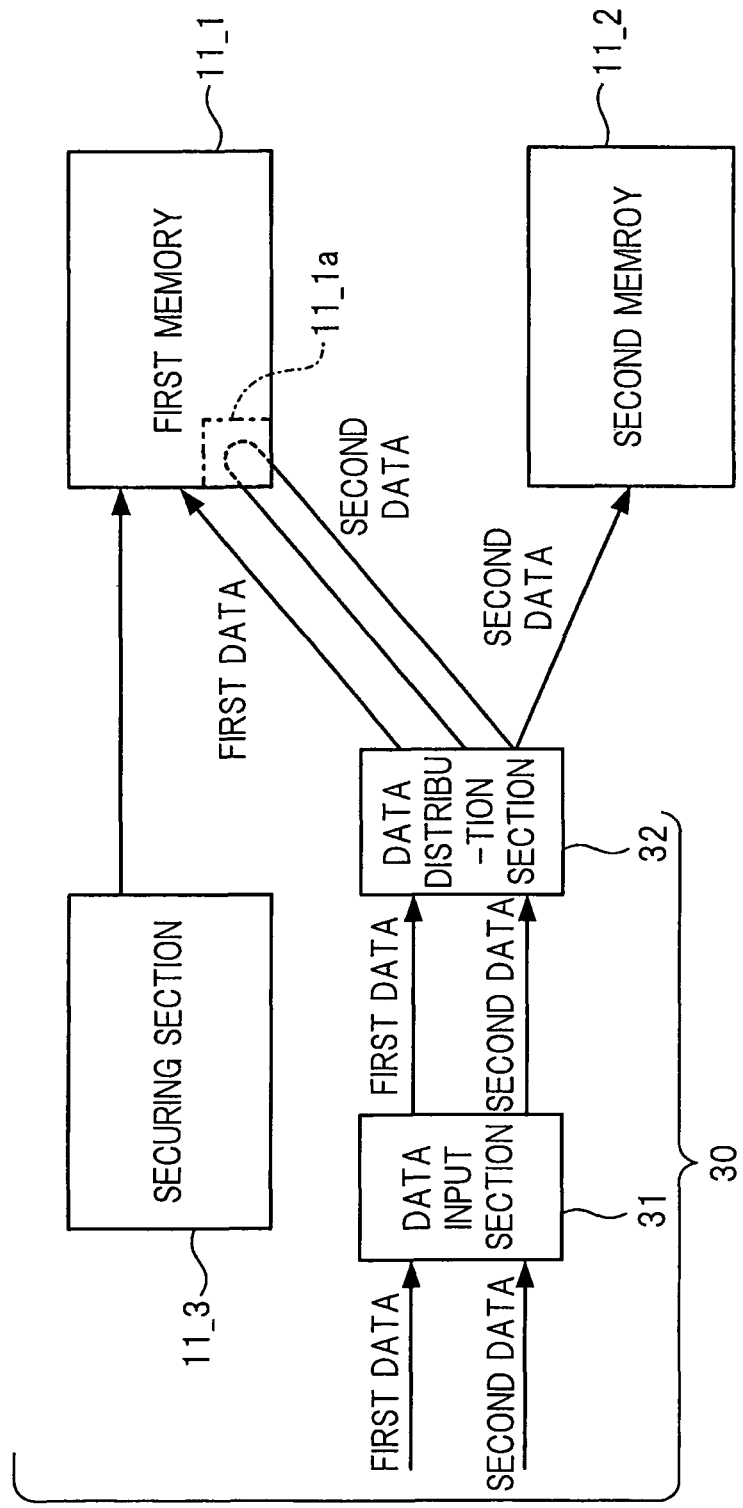
FIG. 3 is a diagram illustrating a third embodiment.

FIG. 3 is a diagram illustrating the third embodiment.

In this FIG. 3 as well, constituent elements that are equivalent to those in FIG. 1 are referred to by the same numerals in FIG. 1 and redundant explanation of those equivalent constituent elements is omitted.

In FIG. 3, a memory control device 30 that is provided with the securing section 11_3, a data input section 31, and a data distribution section 32 is illustrated. In the third embodiment, the memory control device 30 of FIG. 3 corresponds to a concrete embodiment of the memory control device. Further in the third embodiment, the data securing section 11_3, the data input section 31 and the data distribution section 32 of FIG. 3 correspond to an example of the securing section, the data input section and the data distribution section, respectively, of the memory control device in the basic mode.

The data input section 31 receives input of first data and input of second data.

The data distribution section 32 receives, among the inputted data in the data input section 31, with respect to the first data, an instruction to write the first data into the first memory 11_1 and directly stores the first data into the first 11 memory 11_1. Also, the data distribution section 32 receives an instruction to write the second data into the second memory 11_2. And the data distribution section 32 temporarily stores the second data into the first memory 11_1 and also transfers the stored second data from the first memory 11_1 to the second memory 11_2.

According to this memory control device 30, by the data distribution section 32, the second data is transmitted to the second memory 11_2 while utilizing the predetermined area 11_1a of the first memory 11_1 that is a predominant memory as a buffer. That is, according to the memory control device 30, the above-described memory system 11 of FIG. 1 may be easily realized, and eventually high-speed while saving power consumption may be realized in storing data.

Next, a fourth embodiment will be explained.

Figure 4:
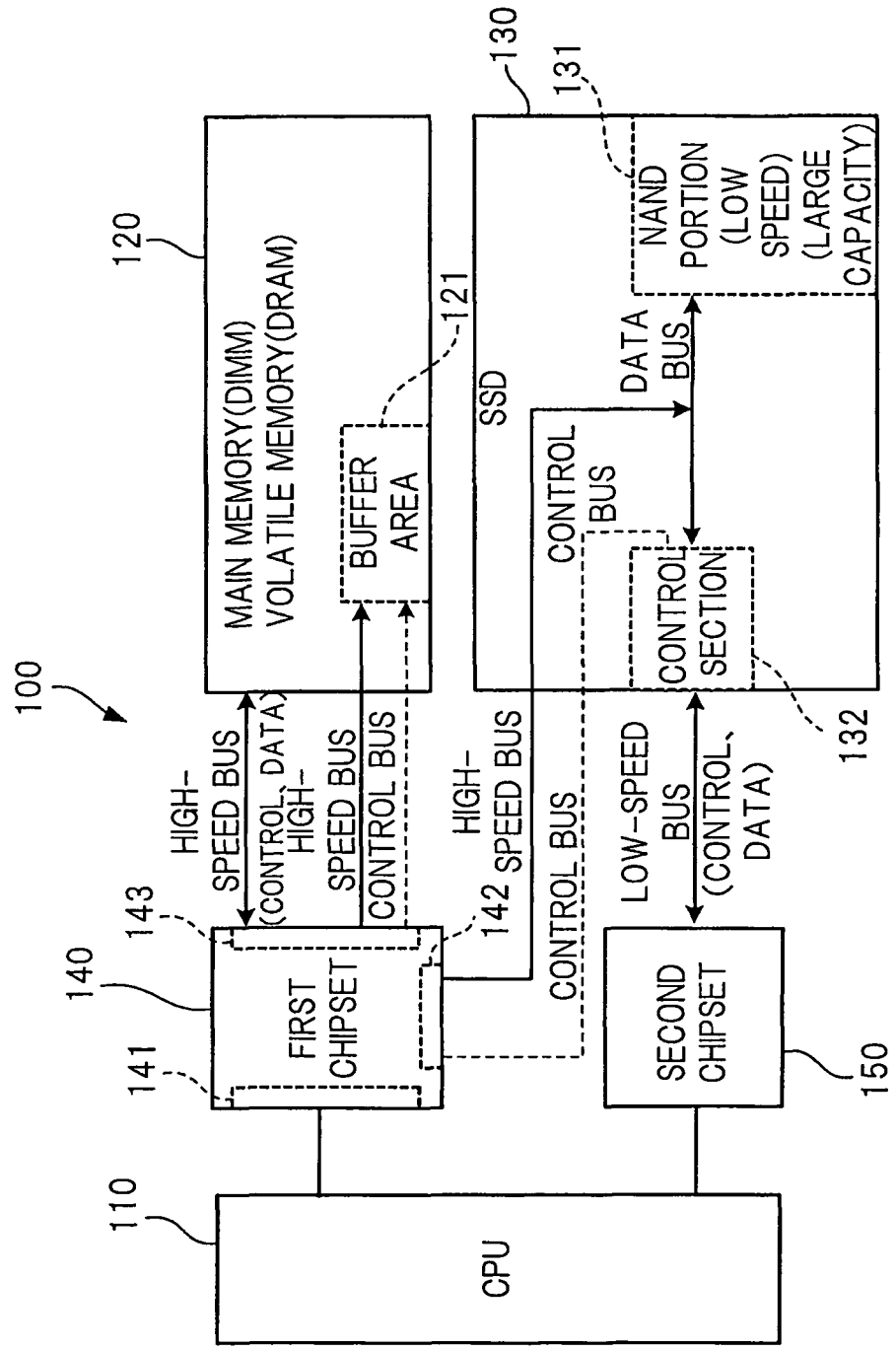
FIG. 4 is a schematic diagram illustrating a fourth embodiment.

FIG. 4 is a schematic diagram illustrating the fourth embodiment.

Note that, in this FIG. 4, a computer 100 is illustrated with a focus on constituent elements relating to data storage in the computer 100. This computer 100 includes, in addition, an I/O interface with an external device and a monitor device on which a result of information processing is displayed. In FIG. 4, illustration of these other constituent elements except the constituent elements relating to data storage is omitted for the sake of simple explanation. Additionally, this is also similar in schematic diagrams illustrating each embodiment to be described later.

In the fourth embodiment, the computer 100 of FIG. 4 corresponds to a concrete embodiment of the information processing device.

In FIG. 4, a CPU 110 performing various kinds of information processing in the computer 100 is illustrated. Further in FIG. 4, a main memory 120, a SSD 130, a first chipset 140 and a second chipset 150 are illustrated as constituent elements relating to data storage in the computer 100. In the fourth embodiment, a combination of the main memory 120, the SSD 130 and the first chipset 140 corresponds to a concrete embodiment of the memory system. Furthermore, in the fourth embodiment, the CPU 110 of FIG. 4 corresponds to an example of the processing section of the above-described information processing device in the basic mode.

The main memory 120 is a memory where a program for various kinds of information processing and various kinds of data are expanded for performing information processing by the CPU 110. In the fourth embodiment, the main memory 120 is a so-called DIMM (Dual Inline Memory Module) in which two or more volatile memory DRAM are installed on a printed board. In the main memory 120, the volatile memory DRAM is responsible for storing data. Because of this, data stored into the main memory 120 is temporary used data that is used temporarily on information processing and lost when a power source of the main memory 120 is shut off. In the fourth embodiment, the main memory 120 corresponds to an example of the first memory in the basic mode. Further in the fourth embodiment, the temporary used data stored into the main memory 120 corresponds to an example of the first data in the basic mode.

Moreover, the main memory 120 is a memory having so-called SPD (Serial Presence Detect) information. The SPD information includes information of the memory per se such as a capacity and speed information, a SSD buffer area information and mapping information. The SPD information is stored in a nonvolatile memory such as an EEPROM (Electrically Erasable Programmable Read-only Memory) that is a not-illustrated constituent element of the main memory 120.

Further in the fourth embodiment, a storage area of the main memory 120 is divided for use into a primary storage area in which the temporary used data is stored and a reserve area for the primary storage area. And information indicating which address area in the main memory 120 belongs to the primary storage area, and which address area belongs to the reserve area is described in the SPD information beforehand. In the fourth embodiment, by referring to this SPD information, the primary storage area and the reserve area are used separately as follows.

At first, the temporary used data is stored into each address in the primary storage area of which location is described in the SPD information. At this time of storage, when storage of the temporary used data into any one of the addresses fails, the address is considered to be broken. Then, an address selected within the reserve area by a predetermined precedence is set to a substitute address of the address considered as broken in the primary storage area. The address considered as broken in the primary storage area and the substitute address corresponding to the broken address are described in the SPD information. After the failure, data transmitted to the address considered as broken is stored into the substitute address in the reserve area.

The SSD 130 is a memory device in which the programs and various kinds of data are stored. This SSD 130 includes a NAND-type flash memory 131 and a control section 132. In the fourth embodiment, the SSD 130 corresponds to a concrete embodiment of the memory device.

The NAND-type flash memory 131 is a storage medium of the SSD 130. The NAND-type flash memory 131 is a nonvolatile memory where a speed of storing data is slower than that of the main memory 120 having a DRAM. The NAND-type flash memory 131 is a storage medium in the SSD 130, corresponding to a magnetic disc in a HDD and has a large capacity. Data that is stored into the NAND-type flash memory 131 is data desirous of holding which is desired to hold after the power source of the SSD 130 is shut off. In the fourth embodiment, the NAND-type flash memory 131 corresponds to an example of the second memory in the basic mode. Furthermore, the data desirous of holding stored into the NAND-type flash memory 131 corresponds to an example of the second data in the basic mode.

In the fourth embodiment, the reserve area of the main memory 120 is utilized as a buffer area 121 of the NAND-type flash memory 131. In addition, this usage as the buffer area 121 is performed for an address except the substitute address in the reserve area.

Here, depending on a broken situation in the primary storage area, many addresses in the reserve area are set to the substitute addresses, probably causing shortage in spare capacity as the buffer area 121. In the fourth embodiment, if the spare capacity of the reserve area is in short like this, a part of the memory area in the primary memory area is occupied so as to make up for the shortage and expand the reserve area. If such expansion is performed, a point indicating an address of the reserve area in the SPD information is replaced with content indicating the address of the reserve area after the expansion. In that case, also a point indicating an address of the primary memory area in the SPD information is replaced with content indicating the address of the primary memory area that is reduced by the occupation.

In this way, in the fourth embodiment, the reserve area that is originally prepared in the main memory 120 or expanded accordingly is utilized as the buffer area 121. With this, a part of the main memory 120 may be utilized as the buffer area 121 without virtually pressing the memory of the temporary used data, which is an original role of the main memory 120.

In the fourth embodiment, the CPU 110 inputs the temporary used data into the first chipset 140. Moreover, the CPU 110 inputs the data desirous of holding into the second chipset 150.

The control section 132 receives the data desirous of holding from the second chipset 150 and transmits to the first chipset 140. In the fourth embodiment, the control section 132 corresponds to an example of the data receiving section in the basic mode.

If the temporary used data is inputted into the first chipset 140 from the CPU 110, the first chipset 140 firstly refers to the SPD information and confirms a location of the primary memory area, a broken address in the primary memory area and a substitute address that is set in the past in the reserve area. Then the first chipset 140 stores the temporary used data into the address of the primary storage area confirmed as such and the substitute address in the reserve area. At this time, if storage into an address in the primary storage area is failed, the first chipset 140 performs the above-described setting of a substitute address. And the first chipset 140 stores the temporary used data that is failed to be stored into the primary storage area, into a newly set substitute address in the reserve area.

When receiving data desirous of holding from the control section 132 of the SSD 130, the first chipset 140 confirms like the following by referring to the SPD information. Namely, in this case, the first chipset 140 confirms an area except the substitute address in the reserve area, as the buffer area 121 of the NAND-type flash memory 131 of the SSD 130. And the first chipset 140 stores the data desirous of holding into the buffer area 121 confirmed as such. Thereafter, the first chipset 140 moves the stored data desirous of holding to the NAND-type flash memory 131 from the buffer area 121.

Furthermore, the first chipset 140 inputs and outputs control data for specifying an address of a data storage location and various kinds of data stored into the storage location at a high input-and-output speed in accordance with the main memory 120 that is a high-speed memory. Therefore, in the fourth embodiment, a high-speed bus is provided, respectively, between the first chipset 140 and the main memory 120 and also between the first chipset 140 and the SSD 130, which serves as a path of the input-and-output of data.

In the fourth embodiment, the first chipset 140 corresponds to a concrete embodiment of the memory control device. Moreover, the first chipset 140 also corresponds to an example combining the securing section and the memory control device in the basic mode.

In the fourth embodiment, the first chipset 140 that is responsible for exchanging the temporary used data with the main memory 120 is also responsible for storing the data desirous of holding into the NAND-type flash memory 131 via the buffer area 121. In the fourth embodiment, by making the first chipset 140 also serve a role of storing the two types of data, the structure related to the storage of these two types of data is intended to be simple.

This means that an application mode that the memory control section also receives a write instruction of data into the first memory and the data is directly stored into the first memory is preferable to the above-described basic mode.

In the fourth embodiment, the first chipset 140 of FIG. 4 also corresponds to an example of the memory control section in this application mode.

Furthermore, in the fourth embodiment, the first chipset 140 utilizes the storage area of the main memory 120 separately as the primary storage area to store temporary used data and the reserve area to be utilized as the buffer area 121 as described above. This separate utilization is performed by the first chipset 140 that refers to the SPD information previously stored in the EEPROM of the main memory 120 or the SPD information that the first chipset 140 per se rewrites appropriately.

In the fourth embodiment, by this separate utilization, the reserve area of the main memory may be utilized as the buffer area of the SSD without, for example, adding a change like addition of a DRAM to a marketed existing main memory.

This means that an application mode that in the first memory, an area except the predetermined area is used as the main memory is preferable to the above-described basic mode.

The main memory 120 in the fourth embodiment also corresponds to an example of the first memory in this application mode.

In addition, the first chipset 140 further includes a first input port 141, a second input port 142 and a data distribution section 143.

The first input port 141 is for letting the temporary used data input from the CPU 110.

The second input port 142 is for letting the data desirous of holding input from the control section 132 of the SSD 130.

The data distribution section 143 transmits the temporary used data received at the first input port 141 to the primary storage area. Also, the data distribution section 143 transmits the data desirous of holding received at the second input port 142 to the NAND-type flash memory 131 of the SSD 130 via the buffer area 121 while designating the reserve area as the buffer area 121.

In the fourth embodiment, a combination of these first input port 141 and the second input port 142 corresponds to an example of the data input section of the memory control device in the basic mode.

Moreover, in the fourth embodiment, by providing these two types of data input ports in the first chipset 140, the two types of data inputted into the first chipset 140 is easily determined in the inside of the first chipset 140.

This means that an application mode to be described below is still more preferable to the above-described application mode that the memory control section also receives a write instruction of data into the first memory.

According to this still more preferable application mode, the memory control section further includes a first input port to which data is inputted and a second input port to which data is inputted. And in this still more preferable application mode, the memory control section handles the data whose input is received by the first input port as data to be written into the first memory, and the data whose input is received by the second input port as data to be written into the second memory.

The first chipset 140 in the fourth embodiment also corresponds to an example of the memory control section in this still more preferable application mode. Moreover, the first input port 141 and the second input port 142 in the fourth embodiment correspond to an example of the first input port and the second input port, respectively, in this still more preferable application mode.

The second chipset 150 receives the data desirous of holding from the CPU 110 and inputs the data desirous of holding into the control section 132 of the SSD 130. The second chipset 150 inputs and outputs control data to specify an address or the like of a storage location of data and various kinds of data to be stored in the storage location at a speed lower than the input-and-output speed of the first chipset 140. Therefore in the fourth embodiment, the low-speed bus is provided between the second chipset 150 and the SSD 130 serving as a path of the input-and-output of these data.

In the fourth embodiment, the data desirous of holding that is inputted into the SSD 130 via the low-speed bus by the second chipset 150 is inputted into the first chipset 140 via the high-speed bus by the control section 132 of the SSD 130. Then, the first chipset 140 once stores the data desirous of holding into the buffer area 121 via the high-speed bus and then moves it to the NAND-type flash memory 131.

Here, a comparative example to compare with the fourth embodiment explained with reference to FIG. 4 will be explained.

Note that this comparative example is different from the fourth embodiment in that a DRAM for buffer is incorporated in the SSD. In the following, explanation will be made about the comparative example with a focus on this different point.

Figure 5:
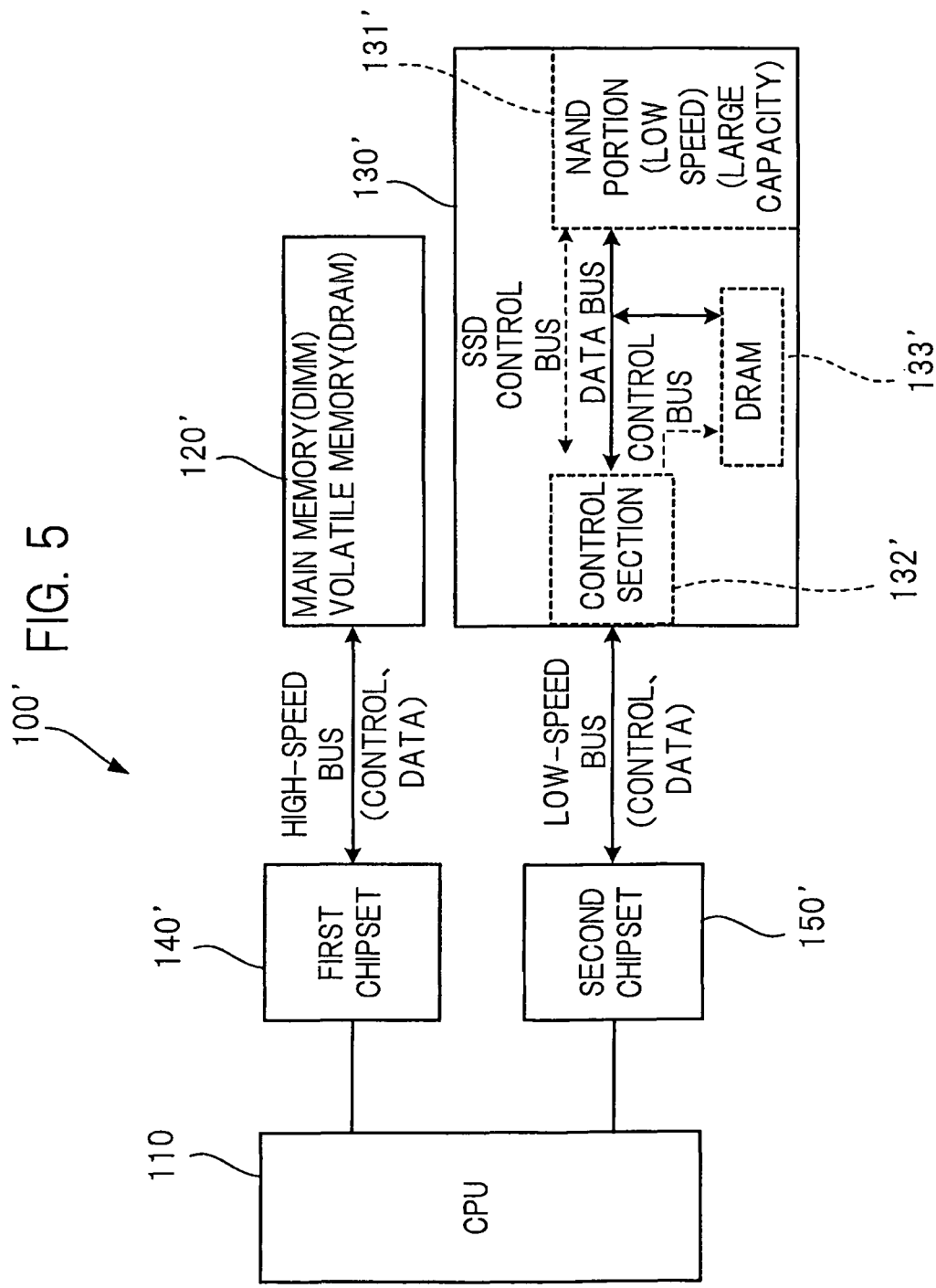
FIG. 5 is a schematic diagram illustrating a comparative example.

FIG. 5 is a schematic diagram illustrating the comparative example.

Note that, in this FIG. 5, the same numeral "110" is given to a CPU that is equivalent to the CPU 110 illustrated in FIG. 4, which is a constituent element of a computer 100'.

In the computer 100' that is a comparative example illustrated in FIG. 5, a main memory 120' having a DRAM is a memory separate from a SSD 130', and a first chipset 140' exchanges data only with the main memory 120'.

In the SSD 130' of FIG. 5, a DRAM 133' as a buffer for the NAND-type flash memory 131' is incorporated as described above. In this SSD 130', a control section 132' moves the data desirous of holding inputted from the second chipset 150' to the NAND-type flash memory 131', after once storing it into the incorporated DRAM 133'. By the DRAM 133' for buffering, a difference between an input speed of the data by the second chipset 150' and a storage speed in the NAND-type flash memory 131' is resolved.

Recently, the SSD is demanded of further speedup, and as such a method, the increase of a capacity of a DRAM for buffering is considered. On the other hand, the SSD is demanded of further power-saving. However, the DRAM needs a large power consumption in many cases, and the power consumption increases further as a capacity of the DRAM becomes larger. Due to this, like the comparative example of this FIG. 5, with a structure that incorporates the DRAM as a buffer in the SSD, in many cases, there is a limit of several MB as the capacity by the demand of power saving and the like.

In contrast, in the fourth embodiment illustrated in FIG. 4, it is possible to utilize approximately several GB of the DRAM included in the main memory 120 of the computer 100 as the buffer area 121 appropriately. Namely, in the computer 100 of FIG. 4, it is possible to obtain a buffering capacity of approximately 100 times to 1,000 times of the buffering capacity of the computer 100' in the comparative example of FIG. 5. In this way, since it is possible to utilize the buffer area 121 of large-capacity, there is almost no need to add a new DRAM and thus the increase of the power consumption is virtually zero. Namely, according to the fourth embodiment, it is possible to realize speedup in data storage while saving electric power at the same time.

In the fourth embodiment, by utilizing the large-capacity of the main memory 120 included in the computer 100 in this manner, the increase of the buffer area is realized without effort as described above.

This means that an application mode that the first memory is the main memory of the information processing device that performs information processing using data is preferable to the above-described basic mode.

The main memory 120 of the present embodiment also corresponds to an example of the first memory in this application mode.

Next, detailed explanation will be made about write processing of the data desirous of holding into the SSD 130, which is performed in the fourth embodiment illustrated in FIG. 4.

Figure 6:
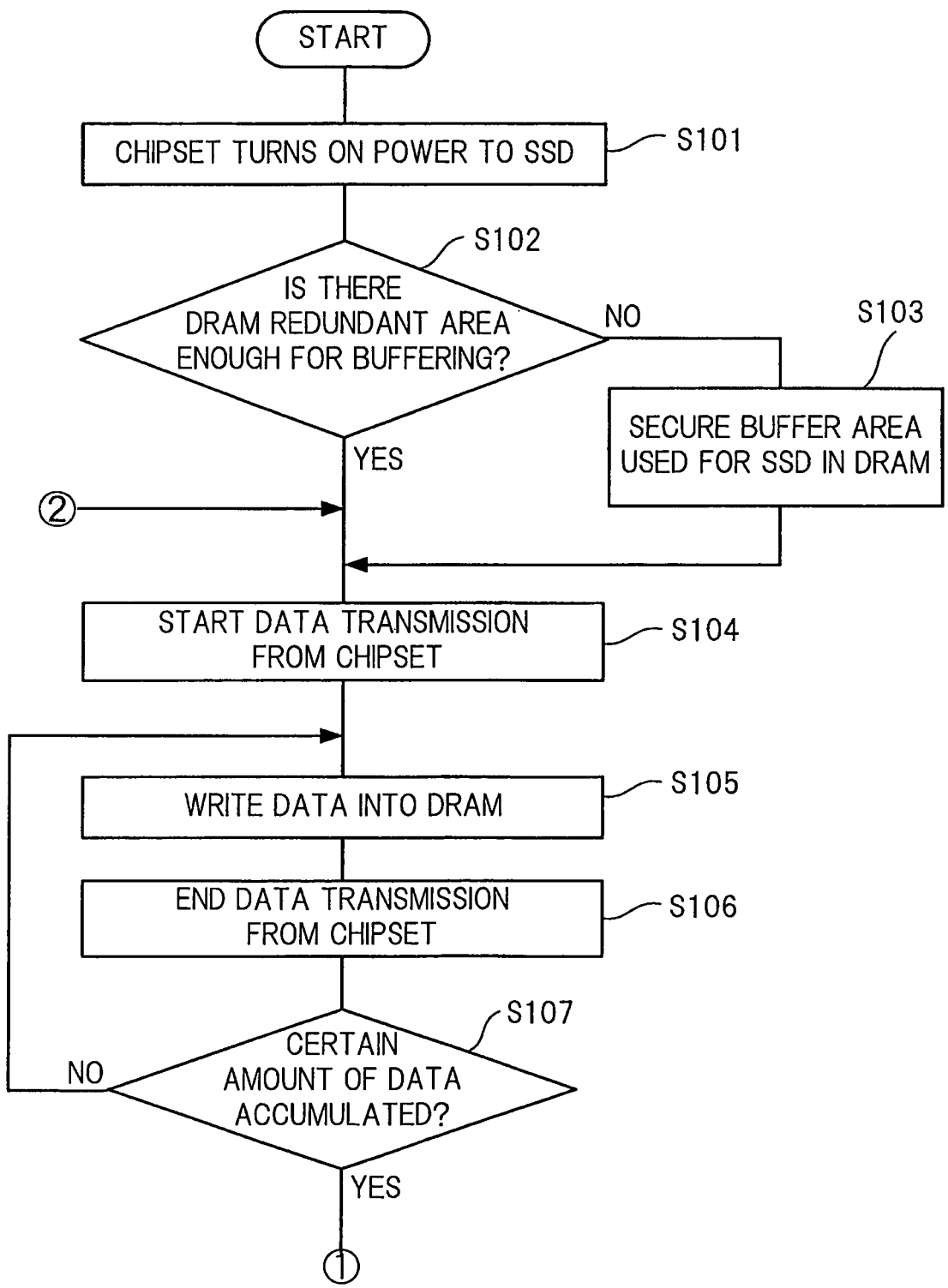
FIG. 6 is a diagram illustrating the first half of the flowchart to express write processing of data desirous of holding into a SSD, performed in the fourth embodiment.
Figure 7:
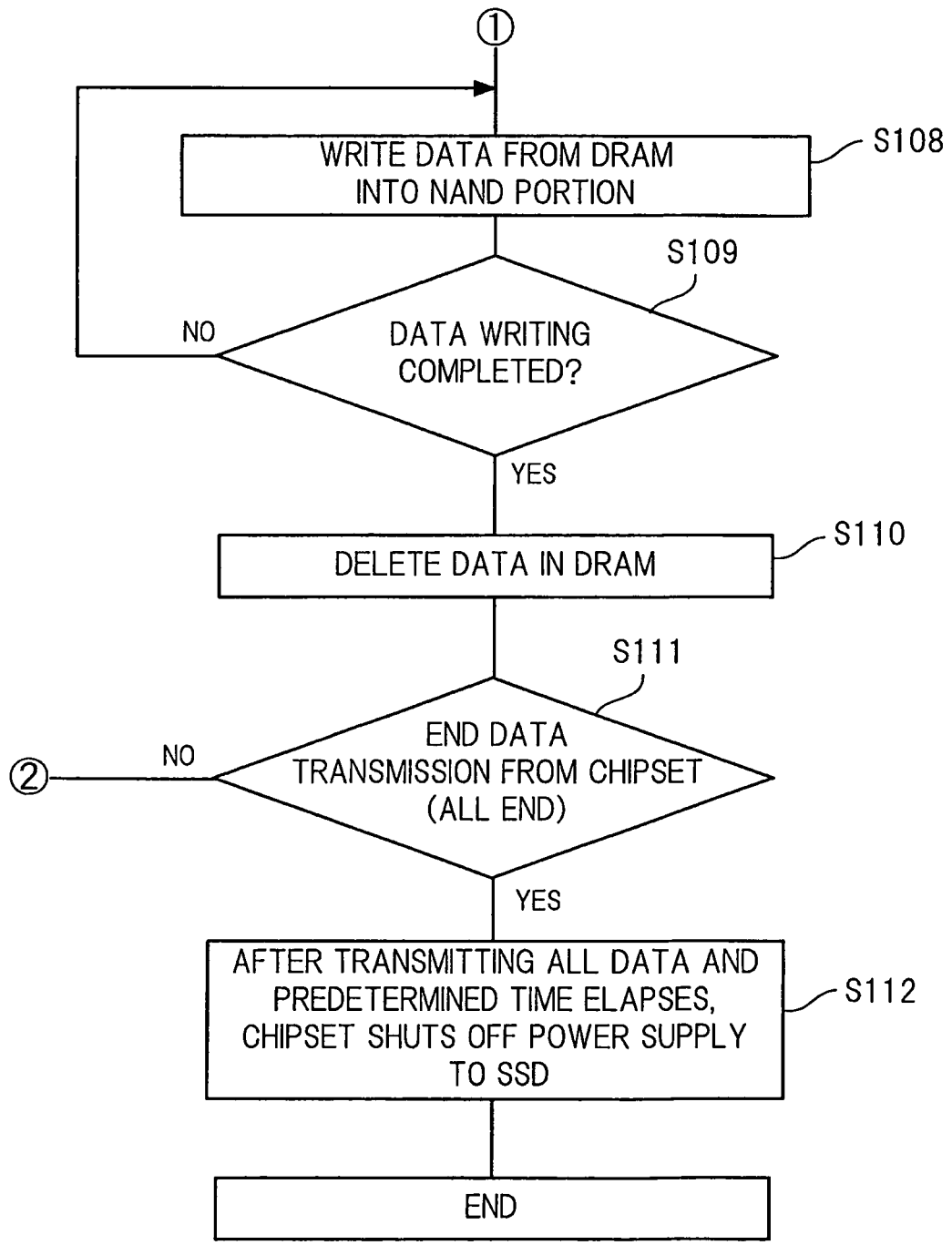
FIG. 7 is a diagram illustrating the latter half of the flowchart to express write processing of the data desirous of holding into the SSD, performed in the fourth embodiment.

FIG. 6 is a diagram illustrating the first half of the flowchart to express the write processing of the data desirous of holding into the SSD, performed in the fourth embodiment, and FIG. 7 is a diagram illustrating the latter half of the flowchart.

The write processing illustrated in the flowcharts of FIGS. 6, 7 starts when data constituting a file of a storage target is transmitted to the second chipset 150 from the CPU 110 of FIG. 4. When the processing starts, at first the second chipset 150 turns on the power source of the SSD 130 (step S101).

Then, the control section 132 of the SSD 130 makes an inquiry like the following to the first chipset 140 (step S102).

In step S102 of FIG. 6, the inquiry is made whether there is enough spare capacity as the buffer area 121 in the reserve area of the main memory 120. The first chipset 140 refers to the SPD information in the main memory 120 and determines whether there is enough spare capacity as the buffer area 121 in the reserve area.

When the first chipset 140 determines that the spare capacity in the reserve area is insufficient as the buffer area 121 (NO judgment in step S102), the control section 132 of the SSD 130 asks the first chipset 140 to perform like the following (step S103).

Firstly, the control section 132 asks the first chipset 140 to calculate a capacity necessary to make up for the deficit of the buffer area 121. And the control section 132 asks the first chipset 140 to extract a part of memory area having the calculated capacity from the memory area except the substitute address in the primary storage area. Further, the control section 132 asks the first chipset 140 to rewrite a point indicating the address of the reserve area in the SPD information like the following. Namely, from the control section 132 to the first chipset 140, regarding the point indicating the address of the reserve area in the SPD information, a request is made to rewrite content so that the content indicates an address of the new reserve area to which the extracted memory area is added. At this time, the point indicating the address of the primary storage area in the SPD information is also rewritten to content indicating the address of the primary storage area that is reduced due to the addition of the part to the reserve area.

By the above-explained processing in step S103, the buffer area 121 having a sufficient capacity is secured in the form of a reserve area.

On the other hand, when a response is returned to the inquiry made in step S102, indicating that the spare capacity of the reserve area is sufficient as the buffer area 121 (YES judgment in step S102), processing of step S103 is omitted and the procedure proceeds to next step S104.

According to the processing in step S102 and step S103, a memory area of an appropriate capacity out of the main memory 120 having several 10 GB is utilized as the buffer area 121.

Subsequently, in step S104, the second chipset 150 starts inputting the data desirous of holding into the SSD 130.

Then, the control section 132 of the SSD 130 inputs the data desirous of holding inputted from the second chipset 150 into the second input port 142 of the first chipset 140 (step S105). In this step S105, the data distribution section 143 of the first chipset 140 confirms a location of the buffer area 121 by referring to the SPD information of the main memory 120, and inputs the data desirous of holding into the buffer area 121.

Here, inputting one file of the data desirous of holding into the SSD 130 from the second chipset 150 is performed while designating an amount of data as one unit according to a data transmission capability via the low-speed bus. In the flowchart here, after the one unit of the data desirous of holding is inputted from the second chipset 150, the input is temporarily finished (step S106). Then, by the first chipset 140, it is determined whether or not a certain amount of the data desirous of holding is accumulated in the buffer area 121 by the storage of the one unit of the data desirous of holding this time (step S107).

If determined that the certain amount of the data desirous of holding is not accumulated yet (NO judgment in step S107), the procedure returns to step S105 to perform storing of a next one unit of the data desirous of holding. That is, in the flowchart here, until when the certain amount of the data desirous of holding is accumulated in the buffer area 121, the storage of the data desirous of holding is repeated (YES judgment in step S107).

If the certain amount of the data desirous of holding is accumulated in the buffer area 121, the first chipset 140 reads out the accumulated data desirous of holding from the buffer area 121 and moves to the NAND-type flash memory 131 of the SSD 130 (step S108). As a result, the data desirous of holding is stored into the NAND-type flash memory 131. Additionally, the storage of the data desirous of holding into the NAND-type flash memory 131 is performed while designating a certain amount of data as one unit according to a speed of storing data in the NAND-type flash memory 131. And when the one unit of the data desirous of holding is stored into the NAND-type flash memory 131, it is determined whether or not the storage is finished for all the data desirous of holding accumulated in the buffer area 121, by the control section 132 of the SSD 130 (step S109).

If determined that the storage is not yet finished for the certain amount of the data desirous of holding (NO judgment in step S109), the procedure returns to step S108 to perform storing of a next one unit of the data desirous of holding.

On the other hand, if determined that the storage is finished for all the certain amount of the data desirous of holding (YES judgment in step S109), the control section 132 of the SSD 130 asks the first chipset 140 like the following (step S110). Namely, in this case, the control section 132 requests the first chipset 140 to erase the data desirous of holding in the buffer area 121. In this step S110, upon receipt of the request from the control section 132, the first chipset 140 performs this erasure.

When the erasure of the data desirous of holding is finished, subsequently, the second chipset 150 determines whether or not storing of all the data desirous of holding that belongs to the file this time per the certain amount is finished (step S111). If determined that the storage is not finished yet (NO judgment in step S111), the procedure returns to step S104 to repeat the processing from step S104 to step S110. On the other hand, if determined that the storage of all the data desirous of holding is finished (YES judgment in step S111), the second chipset 150 shuts off the power source of the SSD 130 (step S112) to finish the write processing this time.

Here, in this embodiment, turn-on and turn-off of the power source of the main memory 120 in which a part is used as the buffer area 121 of the SSD 130 is performed by a power source control section that is a not-illustrated constitute element of the computer 100. In this embodiment, by an instruction of the power-on of the power source, the power sources of the first chipset 140 and the main memory 120 are turned on. And when both accessing to the main memory 120 and storing of the data desirous of holding into the SSD 130 are finished, the power source of the main memory 120 is shut off by the power source control section.

In the above-described step S112, at the time of shutting off the power source of the SSD 130, the accessing to the main memory 120 is finished, and when the instruction of shutting off the power source is made, the power source of the main memory 120 is also shut off by the power source control section.

By the processing explained above, writing of the data desirous of holding into the SSD 130 having a part of the main memory 120 as the buffer area 121 is performed.

Next, a fifth embodiment will be explained.

This fifth embodiment is different from the fourth embodiment in that the entire reserve area is not utilized as the buffer area, but a buffer area according to a memory area except the above-described substitute address in the reserve area is secured. In the following, the fifth embodiment will be explained with a focus on this different point. The hardware configuration of the fifth embodiment is similar to that of the fourth embodiment illustrated in FIG. 4, so that illustration and redundant explanation are omitted here. Incidentally, in the following explanation, each constituent element illustrated in FIG. 4 is referred to as a constituent element of the fifth embodiment accordingly.

Figure 8:
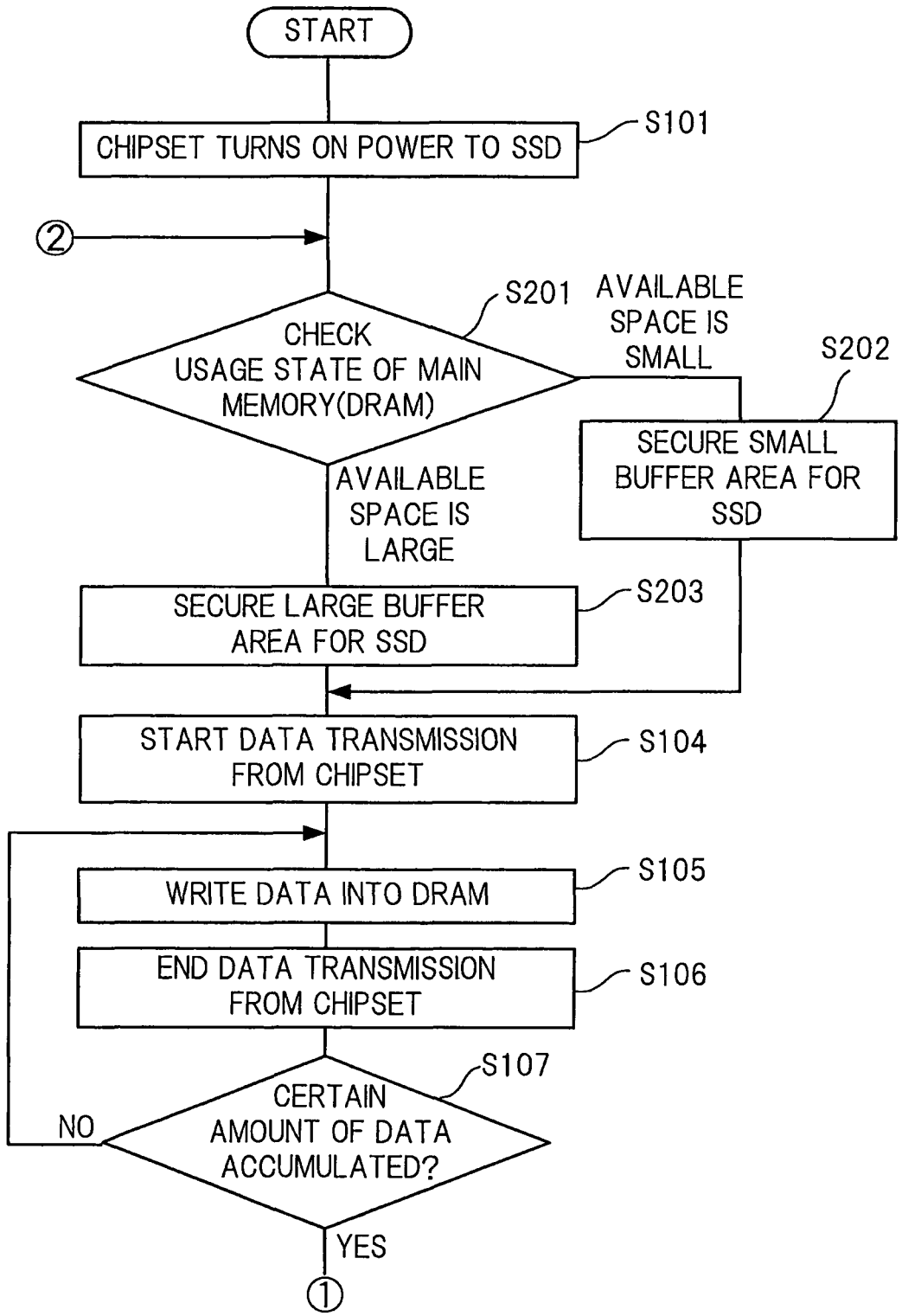
FIG. 8 is a diagram illustrating the first half of the flowchart to express write processing of data desirous of holding into a SSD, performed in the fifth embodiment.

FIG. 8 is a diagram illustrating the first half of the flowchart to express write processing of the data desirous of holding into a SSD performed in the fifth embodiment. Further, FIG. 9 is a diagram illustrating the latter half of the flowchart.

Figure 9:
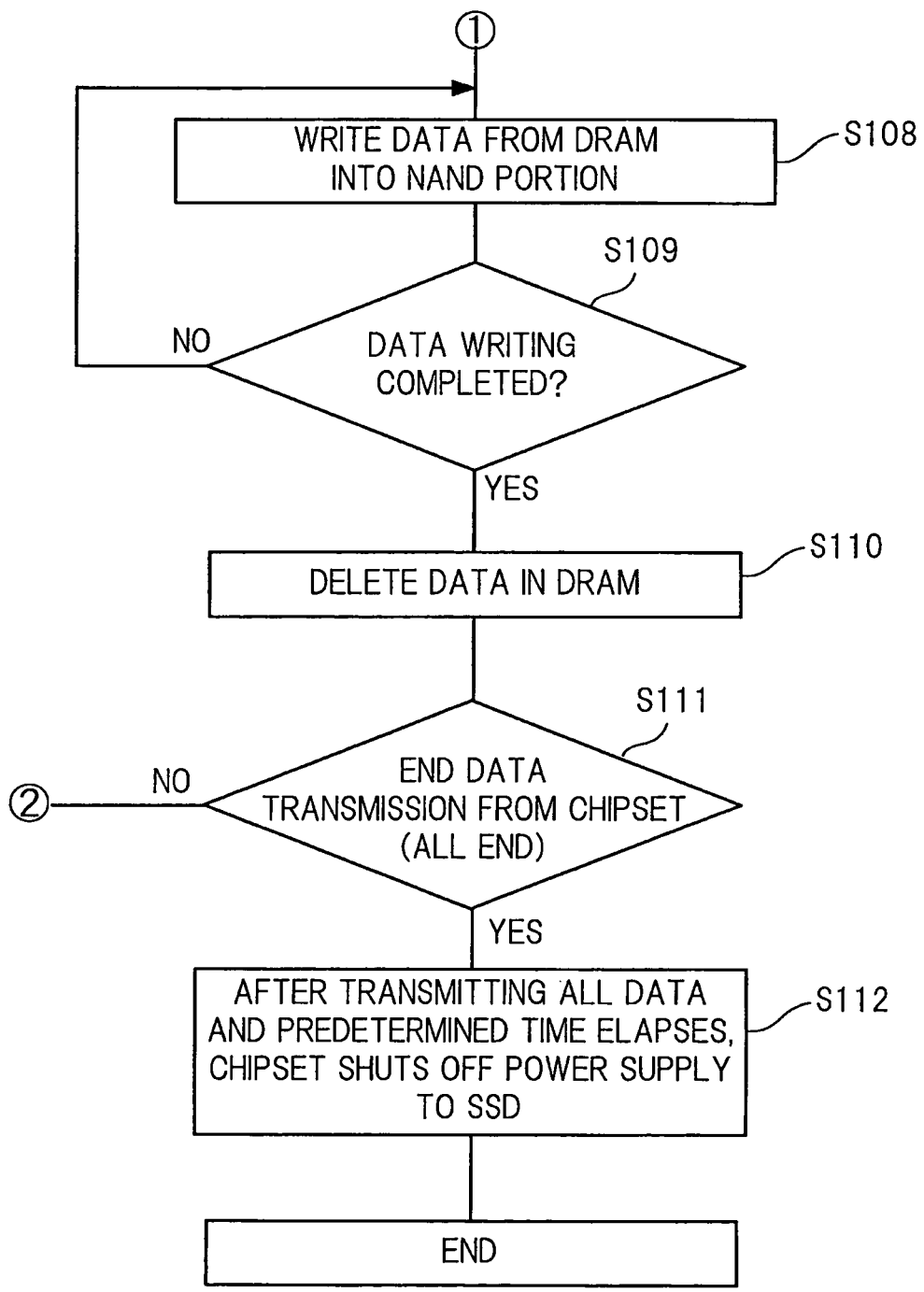
FIG. 9 is a diagram illustrating the latter half of the flowchart to express write processing of the data desirous of holding into the SSD, performed in the fifth embodiment.

In these FIGS. 8 and 9, steps that are equivalent to the step S in the flowchart of FIGS. 6 and 7 to express the write processing in the fourth embodiment are referred to by the same numerals in FIGS. 6 and 7. Hereafter, redundant explanation about those equivalent steps is omitted as well.

In the flowchart of FIG. 8 and FIG. 9, when the power source of the SSD 130 is turned on by the second chipset 150 in step S101, a buffer area is secured in the main memory 120 in the following steps.

Firstly, by a request from the control section 132 of the SSD 130, the first chipset 140 refers to the SPD information of the main memory 120 to confirm how much the reserve area is occupied by the substitute address (step S201). In this step S201, this confirmation is made by a determination whether or not the spare capacity except the substitute address in the reserve area exceeds a predetermined threshold.

In the fifth embodiment, as securing modes of the buffer area 121, a first mode that secures a relatively large-capacity memory area and a second mode that secures a relatively small-capacity memory area are prepared.

When determined in step S201, that the spare area is below the threshold, the first chipset 140 secures the buffer area 121 in the reserve area by the second mode (step S202). On the other hand, when determined that the spare area is above the threshold in step S201, the first chipset 140 secures the buffer area 121 in the reserve area by the first mode (step S203). Moreover, in the fifth embodiment, information indicating an address of the buffer area 121 set in the reserve area is described in the SPD information.

If the buffer area 121 is secured in this manner, writing of the data into the SSD 130 utilizing the buffer area 121 is performed by the procedure from step S104 to step S112 similarly as in the fourth embodiment.

Also by the fifth embodiment explained in the above, it goes without saying that high-speed and power saving are realized at the same time in storing data, like the above-described fourth embodiment. Further in this fifth embodiment, a capacity of the buffer area 121 is adjusted according to a usage situation of the main memory 120. By this adjustment, a part of the main memory 120 may be utilized all the more efficiently as the buffer area 121.

Next, a sixth embodiment will be explained.

This sixth embodiment is different from the fourth embodiment in that the control section of the SSD is responsible for storing the data desirous of holding into the NAND-type flash memory by utilizing a part of the main memory as the buffer. Hereafter, explanation of the sixth embodiment will be made with a focus on this different point.

Figure 10:
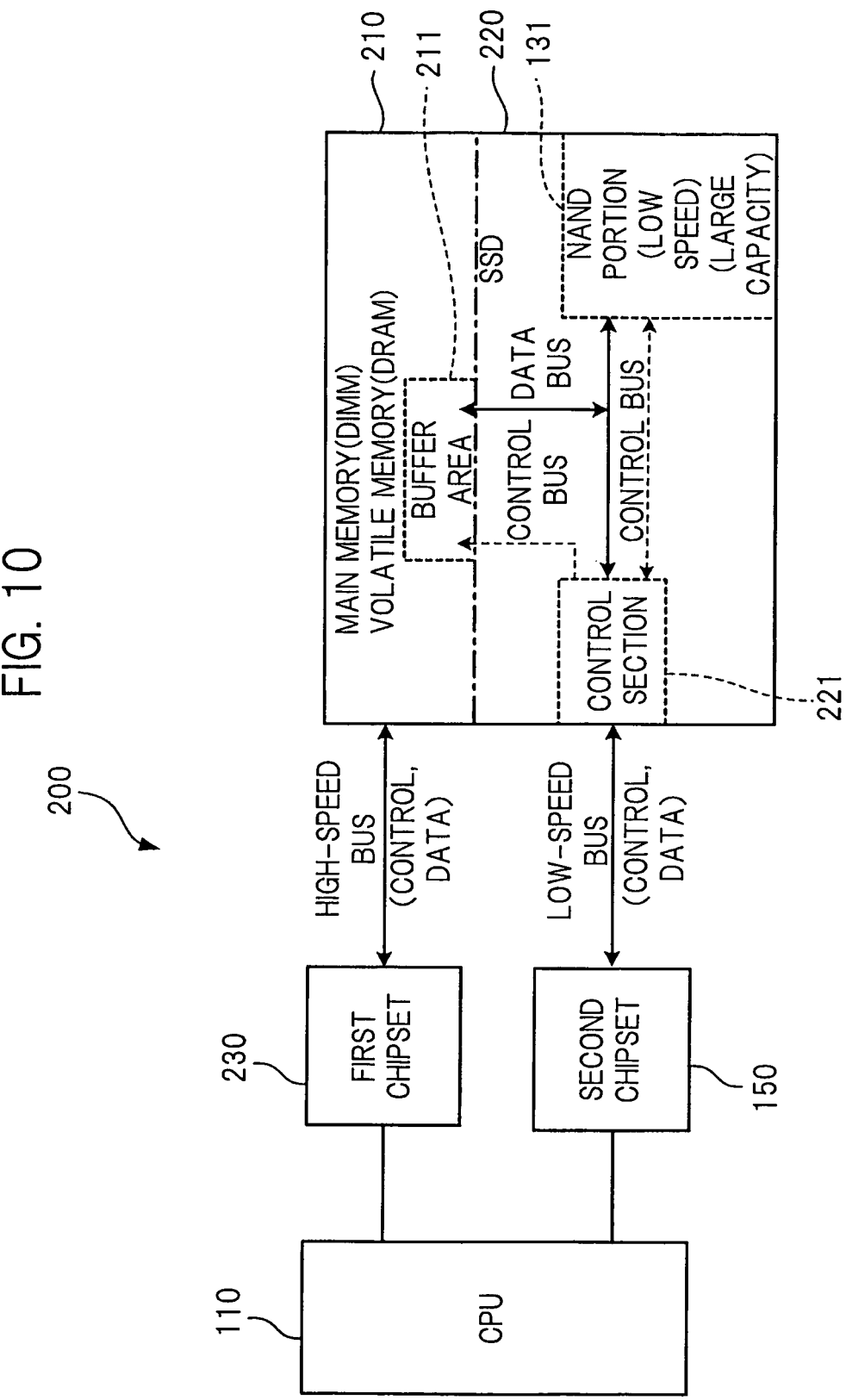
FIG. 10 is a schematic diagram illustrating a sixth embodiment.

FIG. 10 is a schematic diagram illustrating the sixth embodiment.

Note that, in this FIG. 10, constituent elements that are equivalent to those of the fourth embodiment illustrated in FIG. 4 are referred to by the same numerals in FIG. 4. Hereafter, redundant explanation about those equivalent constituent elements is omitted.

In a computer 200 of FIG. 10, a main memory 210 is installed on a SSD 220. As a result, in the sixth embodiment, a physical distance between the main memory 210 and the control section 221 of the SSD 220 is made closer. Therefore in the sixth embodiment, the control section 221 of the SSD 220 is responsible for the above-described memory control function that is in charge of the first chipset in the fourth embodiment.

As such, in the sixth embodiment, a first chipset 230 has a high-speed bus only between per se and the main memory 210.

The control section 221 of the SSD 220 once stores the data desirous of holding transmitted via the low-speed bus from the second chipset 150 into the buffer area 211 while designating a reserve area of the main memory 210 as the buffer area 211. Thereafter, the control section 221 moves the data stored into the buffer area 211 to the NAND-type flash memory 131.

On the other hand, the first chipset 230 of the sixth embodiment receives temporary used data from the CPU 110, and stores the data via the high-speed bus into the primary storage area of the main memory 210.

In the sixth embodiment, a combination of the main memory 210 and the SSD 220 corresponds to a concrete embodiment of the memory system. Further, in the sixth embodiment, the main memory 210 of FIG. 10 corresponds to an example of the first memory in the basic mode. Furthermore, in the sixth embodiment, the control section 221 of the SSD 220 of FIG. 10 corresponds to an example combining the securing section and the memory control section in the basic mode.

Incidentally, the write processing of the data desirous of holding into the SSD 220 performed by the control section 221 is performed along the flowcharts of FIG. 6 and FIG. 7 similarly as in the fourth embodiment. However, in the flowcharts of the fourth embodiment, the processing performed by the request of the control section 132 is performed entirely by the control section 221 per se in the sixth embodiment. Here, illustration and repeated explanation are omitted about the write processing of the sixth embodiment.

It is needless to say that high-speed and power saving are realized at the same time in storing data, like the above-described fourth embodiment.

Next, a seventh embodiment will be explained.

In this seventh embodiment, storage of the data desirous of holding from the buffer area in the main memory into the NAND-type flash memory takes place via a nonvolatile flash memory.

Moreover in the seventh embodiment, the second chip set that is responsible for turning on and turning off the power source of the SSD performs turning off of the power source independently of the end of the storage of the data desirous of holding into the NAND-type flash memory. And in the seventh embodiment, the data desirous of holding that is not yet stored into the NAND-type flash memory at the time of turning off the power source is evacuated into the flash memory.

Thus, the seventh embodiment is different from the fourth embodiment in that the data desirous of holding is stored from the buffer area into the NAND-type flash memory via the flash memory and the data desirous of holding is evacuated to the flash memory at the time of shutting off the power source of the SSD. Hereafter, explanation of the seventh embodiment will be made with a focus on these different points.

Figure 11:
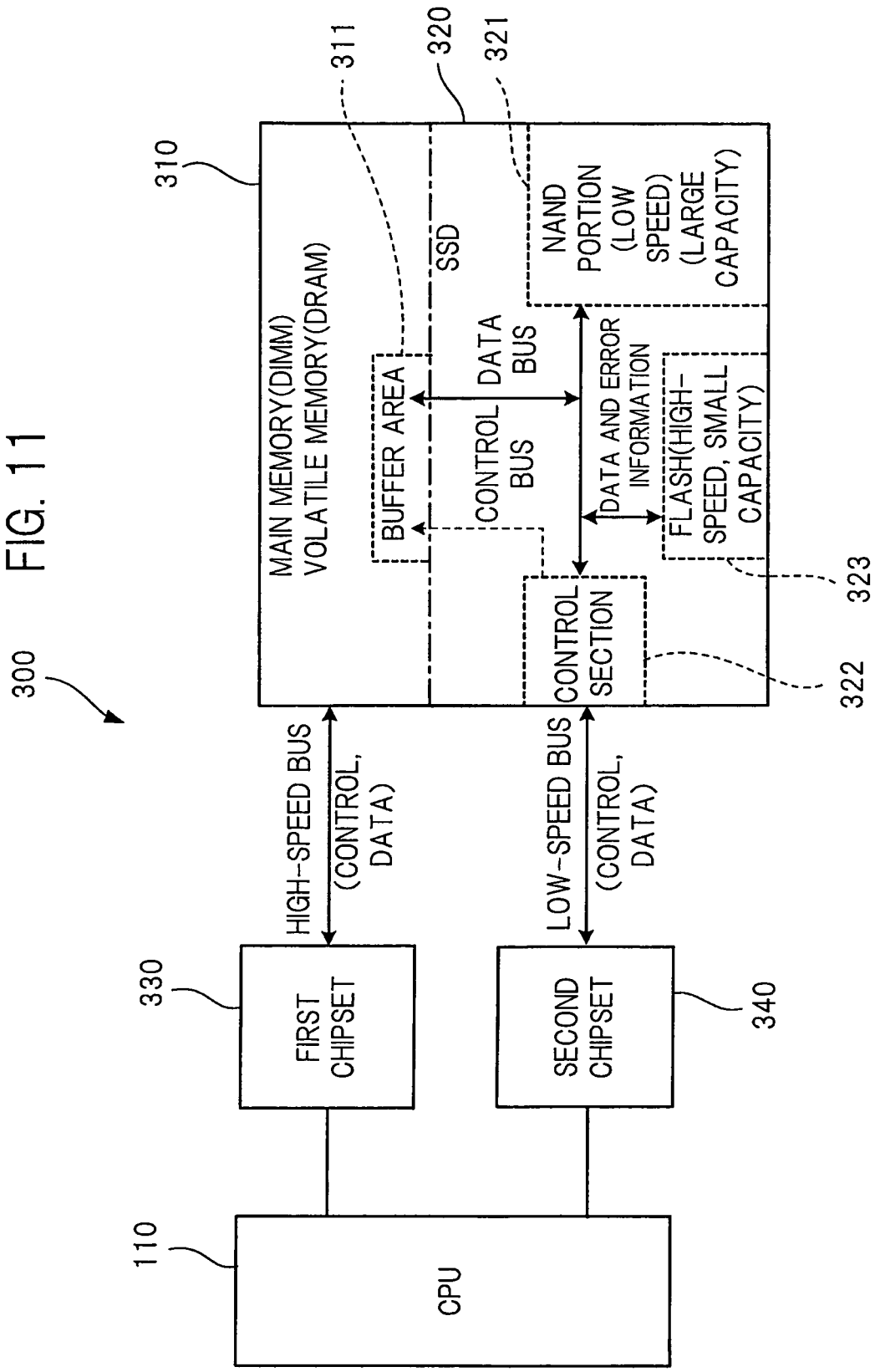
FIG. 11 is a schematic diagram illustrating a seventh embodiment.

FIG. 11 is a schematic diagram illustrating the seventh embodiment.

Incidentally, in this FIG. 11, the same numeral "110" as in FIG. 4 is given to a CPU that is equivalent to the CPU 110 of the fourth embodiment illustrated in FIG. 4, which is a constituent element of a computer 300.

In the computer 300 illustrated in FIG. 11, a SSD 320 has a nonvolatile flash memory 323 to temporarily accumulate the data desirous of holding from a buffer area 311 into a NAND-type flash memory 321. The data desirous of holding in the buffer area 311 is temporarily accumulated in this flash memory 323 until it reaches a certain amount of data. When the data desirous of holding is accumulated to the certain amount of data, the data desirous of holding is moved to the NAND-type flash memory 321. Here, in the NAND-type flash memory 321, there is an upper limit in the number of times of storing data intrinsically in the structure. In the seventh embodiment, the data desirous of holding is once accumulated in the flash memory 323 and then stored into the NAND-type flash memory 321, thereby restricting the number of times of storing.

Also in the seventh embodiment, the flash memory 323 to control the number of times of storing data is utilized for the evacuation of the data desirous of holding from the buffer area 311 of the main memory 310 at the time of the power-off of the SSD 320.

Furthermore, to simplify the data input from the buffer area 311 into the flash memory 323, in the seventh embodiment, the main memory 310 is installed on the SSD 320 similarly as in the sixth embodiment.

Furthermore, a first chipset 330 of the seventh embodiment has a high-speed bus between per se and the main memory 310 and is responsible for storing the data into the main memory 310.

A second chipset 340 of the seventh embodiment has a low-speed bus between per se and a control section 322 of the SSD 320 and is responsible for storing the data desirous of holding. The second chipset 340 is also responsible for turning on power supply and turning off the power supply of the SSD 320. In this embodiment, this turning off the power source is performed independently of the end of data input from the buffer area 311 to the NAND-type flash memory 321. In the seventh embodiment, the turning off the power source is intended to be simple by this processing.

In the seventh embodiment, the control section 322 of the SSD 320 is responsible for storing the data desirous of holding into the NAND-type flash memory 321 and evacuating the data desirous of holding into the flash memory 323 via the buffer area 311 at the time of the power-off.

In the seventh embodiment, a combination of the main memory 310 and the SSD 320 in FIG. 11 corresponds to a concrete embodiment of the memory system.

Further, in the seventh embodiment, the main memory 310 of FIG. 11 corresponds to an example of the first memory in the basic mode. Furthermore, in the seventh embodiment, the SSD 320 of FIG. 11 corresponds to a concrete embodiment of the memory device. Also in the seventh embodiment, the NAND-type flash memory 321 of the SSD 320 of FIG. 11 corresponds to an example of the second memory in the basic mode. Moreover, in the seventh embodiment, the control section 322 of the SSD 320 of FIG. 11 corresponds to an example of combining the securing section and the memory control section in the basic mode.

In the seventh embodiment, as described above, the data desirous of holding is once accumulated in the flash memory 323 and then stored into the NAND-type flash memory 321, thereby restricting the number of times of storing into the NAND-type flash memory 321.

This means that an application mode to be described below is preferable to the above-described basic mode. The application mode is provided with a third memory that has an access speed higher than that of the second memory. In this application mode, the memory control section transfers the data stored into the first memory to the third memory when temporarily storing of the data into the first memory is completed.

The flash memory 323 of the seventh embodiment corresponds to an example of the third memory in this application mode. Further, the control section 322 of the SSD 320 in the seventh embodiment also corresponds to an example of the memory control section in this application mode.

Moreover in the seventh embodiment, utilizing a nonvolatile property of the flash memory 323, the flash memory 323 is also utilized for the evacuation of the data desirous of holding at the time of the power-off of the SSD 320.

This means that an application mode that the third memory is a nonvolatile memory is more preferable to the application mode in which the third memory is provided.

The flash memory 323 of the present embodiment also corresponds to an example of the third memory in this more preferable application mode.

Hereafter, write processing of the data desirous of holding into the SSD 320 performed in the seventh embodiment illustrated in FIG. 11 will be explained.

Figure 12:
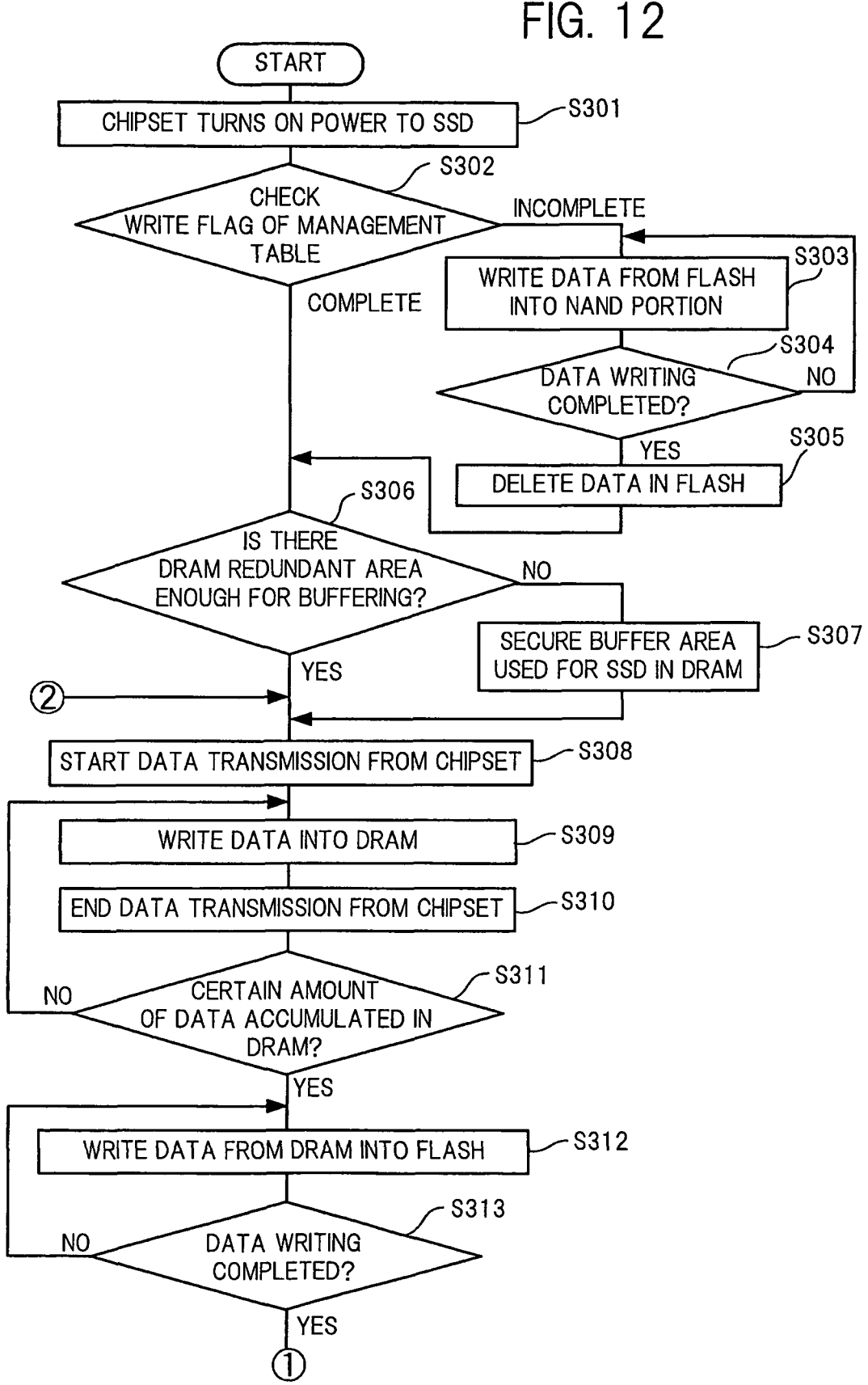
FIG. 12 is a diagram illustrating the first half of the flowchart to express write processing of data desirous of holding into a SSD, performed in the seventh embodiment.

FIG. 12 is a diagram illustrating the first half of the flowchart to express the write processing of the data desirous of holding into a SSD, performed in the seventh embodiment. Further, FIG. 13 is a diagram illustrating the latter half of the flowchart.

Figure 13:
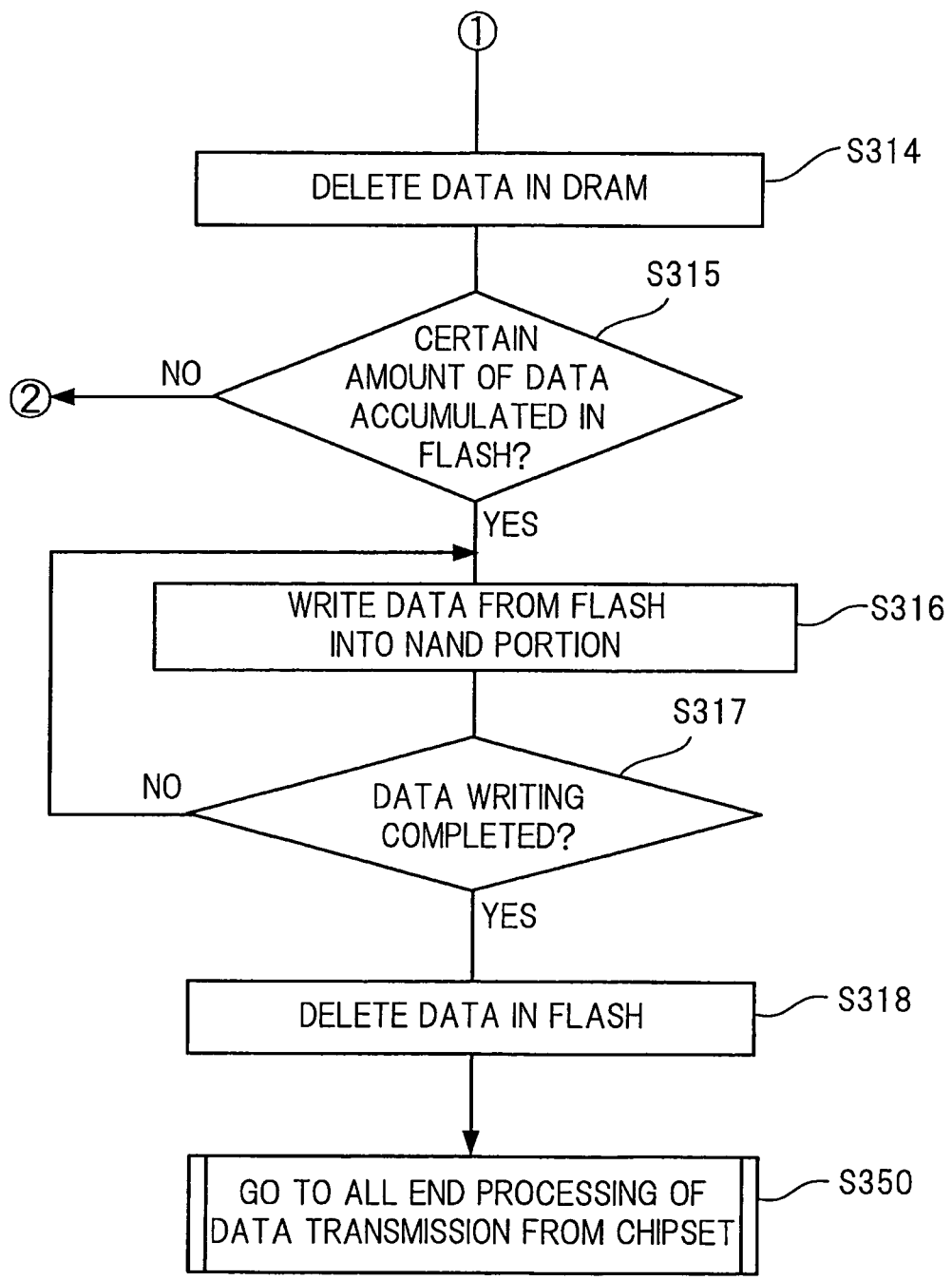
FIG. 13 is a diagram illustrating the latter half of the flowchart to express write processing of the data desirous of holding into the SSD, performed in the seventh embodiment.

The write processing illustrated in the flowcharts of FIGS. 12, 13 starts when the data desirous of holding is transmitted to the second chipset 340 from the CPU 110 of FIG. 11. When the processing starts, at first the second chipset 340 turns on the power source of the SSD 320 (step S301).

Then, the control section 322 of the SSD 320 confirms whether or not the data desirous of holding is left in the flash memory 323 by referring to a management table managing a storage situation of data in each memory of the SSD 320 (step S302).

This confirmation in this step S302 has the following meaning.

In the seventh embodiment, a final data storage into the NAND-type flash memory 321 is storage into the NAND-type flash memory 321 of the data desirous of holding that is temporarily accumulated in the flash memory 323. In the management table referred to in step S302, whether or not storage of the data into the NAND-type flash memory 321 from the flash memory 323 is finished is recorded as a flag. In other words, whether there is the data desirous of holding remaining in the flash memory 323 or not is recorded as a flag in this management table. In this embodiment, as described above, the data desirous of holding that is not yet stored into the NAND-type flash memory 321 and left in the buffer area 311 of the main memory 310 at the time of shutting off the power supply is evacuated into the flash memory 323.

Here in step S302, it is assumed that a confirmation is made that the data desirous of holding is left in the flash memory 323. This means that the data desirous of holding that is evacuated in the write processing performed at the power-on of previous time remains in the flash memory 323. On the other hand, it is assumed that a confirmation is made that the desirous of holding is not left in the flash memory 323. This means that the previous write processing is entirely completed including the storage of the data desirous of holding in the flash memory 323 into the NAND-type flash memory 321.

In other words, in step S302, a confirmation is made whether or not the data desirous of holding that is not stored into the NAND-type flash memory 321 remains in the flash memory 323.

When there is the data desirous of holding that is not stored remaining in the flash memory 323, the control section 322 of the SSD 320 stores the data desirous of holding that is not stored and remaining in the flash memory 323 in the NAND-type flash memory 321 (step S303).

In the seventh embodiment, the storage of the data desirous of holding in the flash memory 323 into the NAND-type flash memory 321 is performed while designating a certain amount of data as one unit. In the flowcharts here, when the one unit of the data desirous of holding in the flash memory 323 is stored, the storage of the data desirous of holding is finished temporarily. When the storage is finished in this manner, by the control section 322, it is determined whether or not all the storage of the data desirous of holding is finished by the storage of the one unit of the data desirous of holding this time (step S304).

If determined that the storage of the data desirous of holding that is not stored is not yet finished (NO judgment in step S304), the procedure returns to step S303 to perform storing of a next unit of the data desirous of holding. Namely, in the flowcharts here, until when all the data desirous of holding that is not stored is completely stored (YES judgment in step S304), the storage of the data desirous of holding is repeated. Thereafter, when all the storage of the data desirous of holding that is not stored is finished, the control section 322 erases the data desirous of holding in the flash memory 323 (step S305) and proceeds to next step S306.

On the other hand, in step S302, if it is confirmed that the data desirous of holding is not left in the flash memory 323, the processing from step S303 through S305 is omitted to proceed to step S306.

In step S306, the control section 322 of the SSD 320 refers to the SPD information of the main memory 310 to determine whether or not there is sufficient spare capacity that is not set to the substitute address in the reserve area (step S307). If determined that the spare capacity in the reserve area is not sufficient as the buffer 311 (NO judgment in step S306), the control section 322 of the SSD 320 performs processing like the following. Namely, in this case, the control section 322 calculates a capacity to make up for the deficit, extracts a memory area having the calculated capacity out of the primary storage area and rewrites the SPD information according to a result of the extraction. By a series of these processing, the reserve area is expanded to a sufficient capacity as the buffer area 311.

On the other hand, if determined that the spare capacity in the reserve area is sufficient (YES judgment in step S306), processing of step S307 is omitted to proceed to next step S308.

In this step S308, the second chipset 340 starts inputting the data desirous of holding into the SSD 320.

Then, the control section 322 receives the data desirous of holding and stores the data desirous of holding into the buffer area 311 secured as described above (step S309).

Here, storing one file of the data desirous of holding is performed while designating a certain amount of data as one unit. In the flowchart here, after the one unit of the data desirous of holding is stored, the storage is temporarily finished (step S310). Then, by the control section 322 of the SSD 320, it is determined whether or not a certain amount of the data desirous of holding is accumulated in the buffer area 311 by the storage of the one unit of the data desirous of holding this time (step S311).

If determined that the certain amount of the data desirous of holding is not accumulated yet (NO judgment in step S311), the procedure returns to step S309 to perform storing of a next one unit of the data desirous of holding. That is, in the flowchart here, until when the certain amount of the data desirous of holding is accumulated in the buffer area 311, the storage of the data desirous of holding is repeated (YES judgment in step S311).

If the certain amount of the data desirous of holding is accumulated in the buffer area 311, the control section 322 of the SSD 320 reads out the accumulated data desirous of holding from the buffer area 311 and stores into the flash memory 323 (step S312). Additionally, the storage of the data desirous of holding into the flash memory 323 is performed while designating a certain amount of data as one unit as well. And when the one unit of the data desirous of holding is stored into the flash memory 323, it is determined whether or not the storage is finished for all the data desirous of holding accumulated in the buffer area 311, by the control section 322 of the SSD 320 (step S313).

If determined that the storage is not yet finished (NO judgment in step S313), the procedure returns to step S312 to perform storing of a next one unit of the data desirous of holding.

On the other hand, if determined that the storage is finished for all the certain amount of the data desirous of holding (YES judgment in step S313), the control section 322 of the SSD 320 performs processing like the following (step S314).

Namely, in this case, the control section 322 erases the certain amount of the data desirous of holding stored in the flash memory 323 this time.

When the erasure of the data desirous of holding is finished, subsequently, the control section 322 of the SSD 320 determines whether or not an amount of the data desirous of holding that is accumulated in the flash memory up until this processing is beyond the certain threshold (step S315).

If determined that the amount of the data desirous of holding accumulated in the flash memory 323 does not exceed the threshold (NO judgment in step S315), the procedure returns to step S308 to repeat the processing from this step S308 to step S314. By this repetition, the storage of the data desirous of holding into the buffer area 311 of the main memory 310 and the storage of the data desirous of holding into the flash memory 323 is again performed.

If determined that the data desirous of holding is accumulated in the flash memory 323 to reach the data amount more than the threshold (YES judgment in step S315), the control section 322 of the SSD 320 performs processing like the following (step S316). Namely, in this case, the control section 322 stores the data desirous of holding in the flash memory 323 into the NAND-type flash memory 321.

As described above, the storage of the data desirous of holding in the flash memory 323 into the NAND-type flash memory 321 is performed while designating a certain amount of data as one unit. In the flowchart here, after the one unit of the data desirous of holding is stored, the storage of the data desirous of holding from the flash memory 323 is temporarily finished. Then, by the control section 322, it is determined whether or not the storage is finished for all the data desirous of holding accumulated in the flash memory 323 (step S317).

If determined that the storage is not yet finished for all the data desirous of holding (NO judgment in step S317), the procedure returns to step S316 to perform storing of a next one unit of the data desirous of holding. That is, in the flowchart here, until when all the data desirous of holding is stored into the flash memory 323, the storage of the data desirous of holding is repeated (YES judgment in step S317). When all the storage of the data desirous of holding is finished, the control section 322 erases the data desirous of holding in the flash memory 323 (step S318), and all end processing (step S350) to be explained below is performed.

Note that, here, the all end processing is essentially independent processing, which is performed in parallel with the write processing explained up to here. However, in the present embodiment, the all end processing is also utilized as a subroutine of the write processing, which is performed through the above-described step S318.

Figure 14:
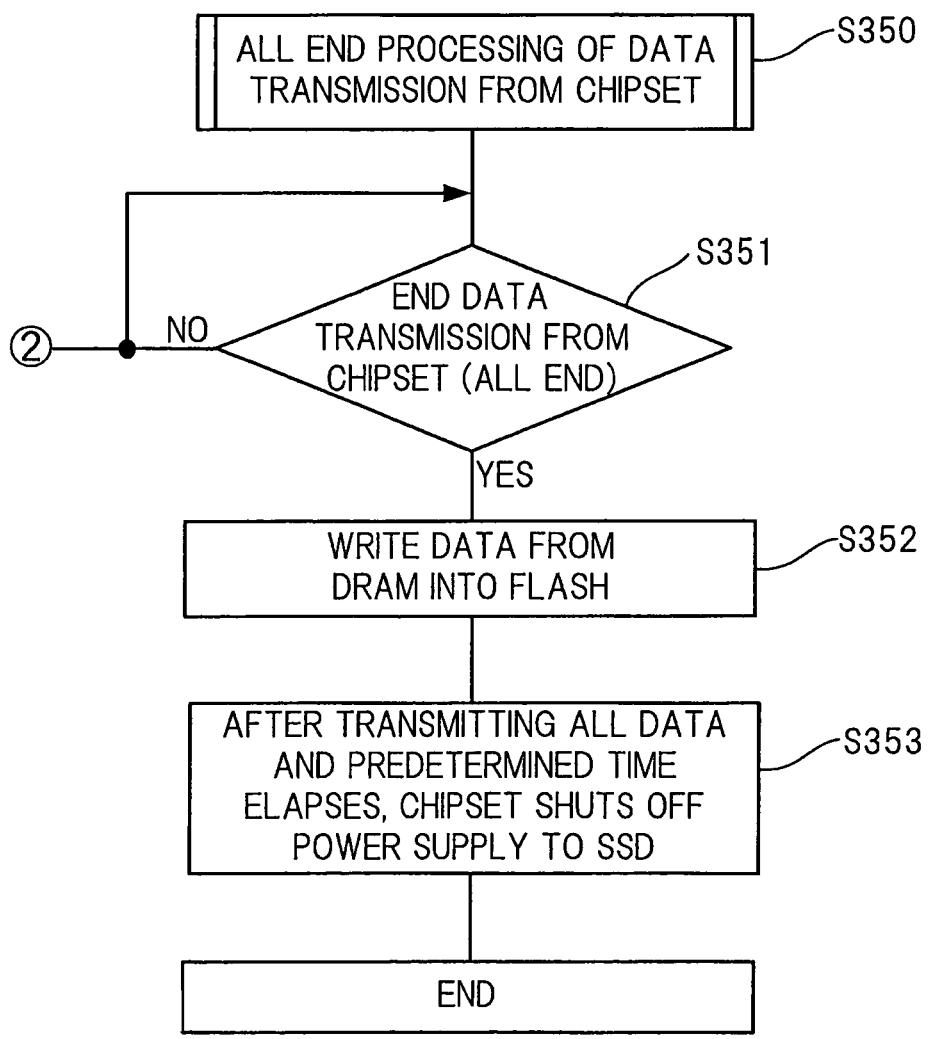
FIG. 14 is a flowchart illustrating all end processing.

FIG. 14 is a flowchart illustrating the all end processing.

Here, firstly, explanation will be made about a case in which this all end processing (step S350) is performed as a subroutine through step S318 of the write processing.

First of all, the second chipset 340 determines whether or not the storage into the SSD 320 of all the data desirous of holding constituting a file this time is finished (step S351).

If determined that the storage is not yet finished (NO judgment in step S351), the procedure returns to the write processing in step S308 of FIG. 12. Then the write processing is continuously performed.

On the other hand, if determined that the storage of all the data desirous of holding is finished (YES judgment in step S351), processing of next step S352 is prepared in the all end processing. Processing of step S352 is one that the control section 322 of the SSD 320 stores the data desirous of holding in the buffer area 311 of the main memory 310 into the flash memory 323. However, when this all end processing is executed as a subroutine through step S318 of the write processing, the data desirous of holding in the buffer area 311 is already erased in step S314 of FIG. 13. Because of this, in step S352 of FIG. 14 substantially nothing is performed and the procedure proceeds to next step S353.

In this step S353, the second chipset 340 shuts off the power source of the SSD 320 after a predetermined time elapses from the completion of the storage of the data desirous of holding into the SSD 320, and finishes the all end processing in FIG. 14 including the write processing.

Here, in the seventh embodiment, the power-on and power-off of the main memory 310 are performed by a power control section that is a not-illustrated constituent element of the computer 300. In the seventh embodiment, according to an instruction of the power-on, the power of the first chipset set 330 and the main memory 310 is turned on by the power control section. The power of the SSD 320 is turned on by the second chipset 340. When both of the access to the main memory 310 and the storage of the data desirous of holding into the SSD 320 are finished, the power source of the main memory 310 is shut off by the power supply control section.

In step S353, the access to the main memory 310 is finished at the time of shutting off the power source of the SSD 320, and when the instruction of power-off is made, the power source of the main memory 310 is also shut off by the power supply control section.

Next, explanation will be made about a case in which this all end processing (step S350) is performed in parallel with the write processing, independently of the write processing.

In this case, the processing in step S351 is monitoring processing of data input per se by the second chipset 340 per a certain time period. At this time, even if it is determined that the data input is not finished, the procedure does not return to step S308 of FIG. 12 as in the above and continues monitoring only.

Here, explanation will be made about a situation in which the all end processing is performed independently of the write processing and the data input is determined to be finished in step S351.

As described above, the input of one file of the data desirous of holding from the second chipset 340 into the SSD 320 is performed while designating a certain amount of data as one unit. At this time, among plural units of the data that belong to this file and that are stored in order, the all end processing functions as a subroutine for the unit data immediately before the last unit data. And in that case, the procedure always returns to step S308 of FIG. 12 by the determination in step S351 of FIG. 14.

However, when the last unit data is inputted from the second chipset 340 into the SSD 320, it is determined that the data input is finished in the processing of step S351 of FIG. 14 at a time point when the processing of step S310 of FIG. 12 is finished. Besides, at this time, since the processing of step S312 and the processing of step S314 of FIG. 12 are not performed yet, there in the buffer area 311, the last unit data that is not yet stored into the flash memory 323 remains.

As described above, if the access to the main memory 310 is finished, the power of the main memory 310 is shut off by the power supply control section. Since the unit data remaining in the buffer area 311 is stored into the DRAM of the main memory 310, the unit data is lost with the shut off the power.

Therefore, in the all end processing that is performed independently of the write processing, the last data remaining in the buffer area 311 is evacuated to the flash memory 323 in the processing of step S352 of FIG. 14. This evacuation is completed after the data input of the second chipset 340 is completed and until when the power of the main memory 310 and the SSD 320 is shut off in step S353. In step S353, the power of the main memory 310 and the SSD 320 are shut off after the completion of this evacuation.

The last unit data that is evacuated in this manner is stored into the NAND-type flash memory 321 by the processing of step S303 of FIG. 12, when the second chipset 340 starts the next data input.

It is needless to say that also by the seventh embodiment explained above, high-speed and power saving are realized at the same time in storing data, like the above-described fourth embodiment.

Next, an eighth embodiment will be explained.

This eighth embodiment is a modified example of the seventh embodiment in which the power-off processing of the SSD is performed independently of the completion of storing the data desirous of holding into the NAND-type flash memory of the SSD. The eighth embodiment is different from the seventh embodiment in the following two points. Firstly, a point that the main memory has a MRAM (Magneto-resistive Random Access Memory) that has a nonvolatile property, and data is stored into the MRAM is different from the seventh embodiment. Secondly, a point that the SSD includes only the NAND-type flash memory similarly as in the first through sixth embodiments is different from the seventh embodiment. In the following, the eighth embodiment will be explained with a focus on these different points.

Figure 15:
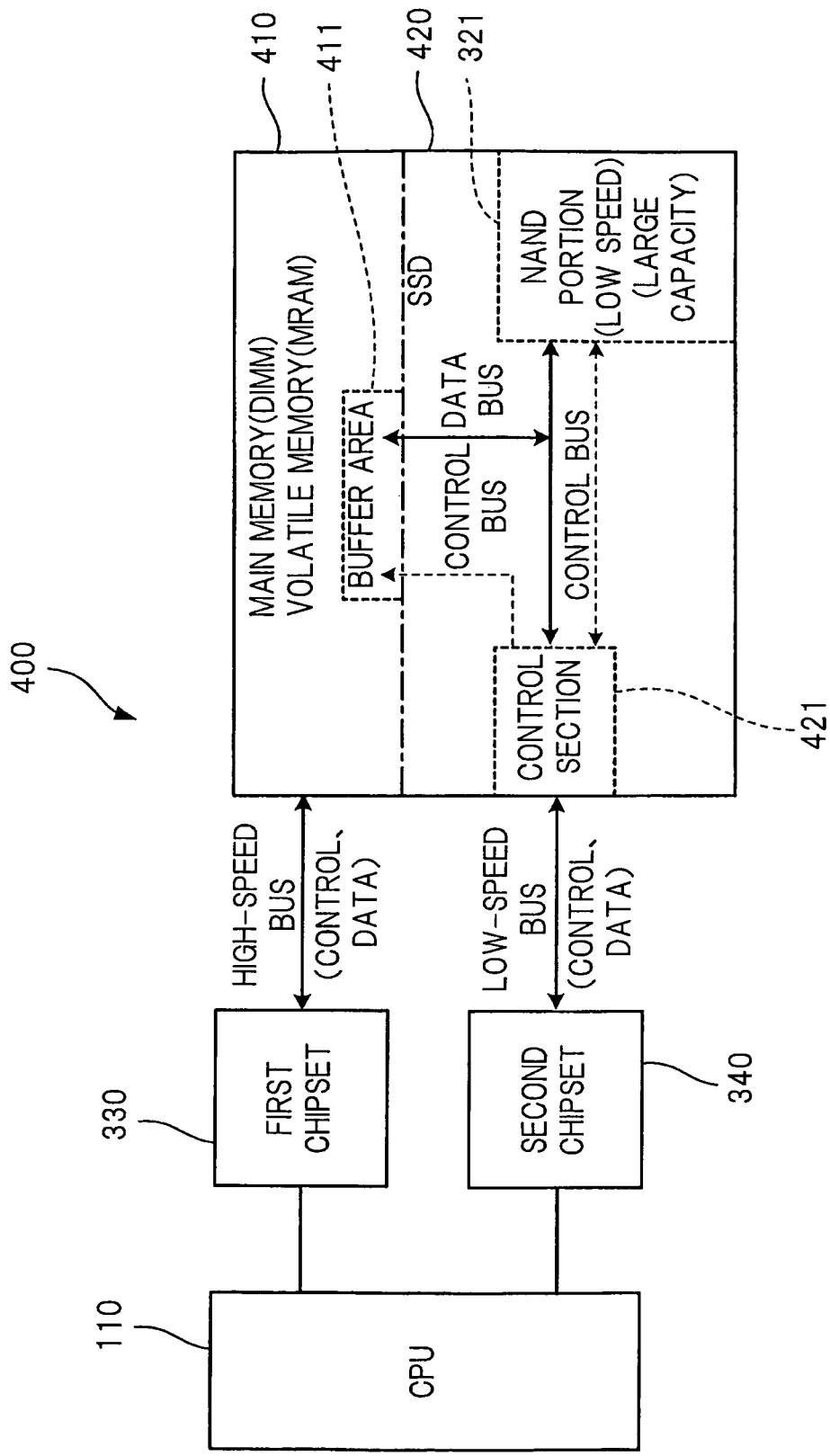
FIG. 15 is a schematic diagram illustrating an eighth embodiment.

FIG. 15 is a schematic diagram illustrating the eighth embodiment.

Incidentally, in this FIG. 15, constituent elements that are equivalent to those of the seventh embodiment illustrated in FIG. 11 are referred to by the same numerals in FIG. 11. Hereafter, redundant explanation about those equivalent constituent elements is omitted.

In a computer 400 of this FIG. 15, as described above, a main memory 410 is different from each embodiment up to here and includes a MRAM instead of the DRAM. The MRAM has a magnetic reluctance effect element and is a storage medium to store data in a direction of the magnetization. Further, the MRAM has a low-power consumption and a nonvolatile property.

Furthermore, in the computer 400 of this FIG. 15, even if the power source of a SSD 420 is shut off before finishing the storage of the data desirous of holding to the NAND-type flash memory 321, due to the nonvolatile property of the MRAM, the data desirous of holding that is not yet stored remains in a buffer area 411 after the power source is shut off. Therefore, in the eighth embodiment, like the seventh embodiment, the processing to evacuate the data desirous of holding that is not yet stored into the flash memory is unnecessary.

In the eighth embodiment, a combination of the main memory 410 and the SSD 420 of FIG. 15 corresponds to a concrete embodiment of the memory system. Also, in this embodiment, the main memory 410 of FIG. 15 corresponds to an example of the first memory in the basic mode. Furthermore, in the eighth embodiment, the control section 421 of the SSD 420 of FIG. 15 corresponds to an example combining the securing section and the memory control section in the basic mode.

Further, in the eighth embodiment, the main memory 410 has a nonvolatile MRAM and a part of the main memory 410 is utilized as a buffer area 411. Because of this, at the time of shutting off the power-source of the main memory 410, even if there is the data desirous of holding that is not yet stored into the NAND-type flash memory 321 remaining in the buffer area 411, the data desirous of holding that is not yet stored is left in the buffer area 411. In the eighth embodiment, by this configuration, the storage of the data desirous of holding into the NAND-type flash memory 321 is designed to be secure.

This means that the application mode that the first memory is a nonvolatile memory is preferable to the basic mode.

In the eighth embodiment, the buffer area 411 of FIG. 15 corresponds to an example of the first memory in this application mode.

Hereafter, explanation will be made about write processing of the data desirous of holding into the SSD 420, performed in the eighth embodiment illustrated in FIG. 15.

Figure 16:
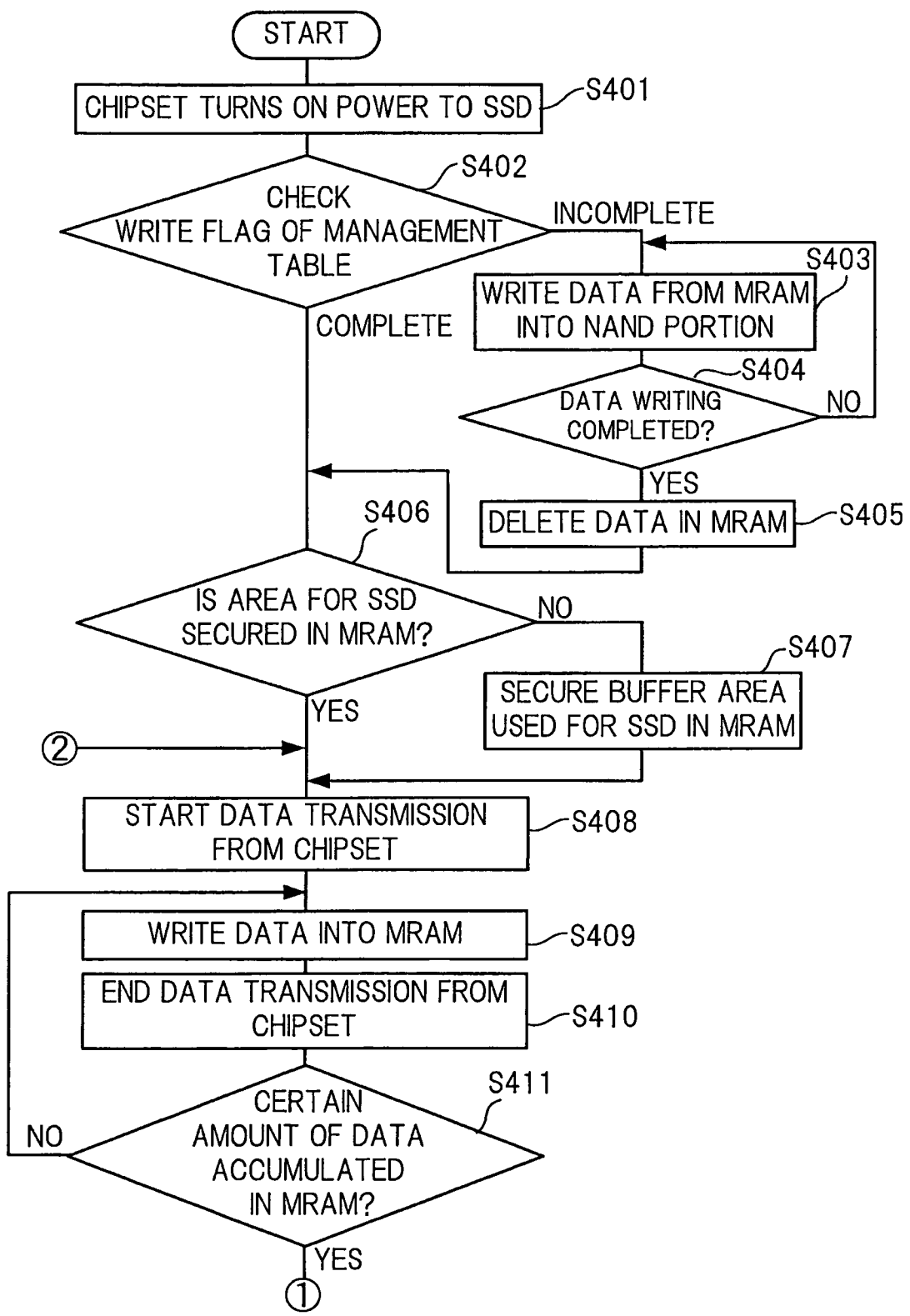
FIG. 16 is a diagram illustrating the first half of the flowchart to express write processing of data desirous of holding into a SSD, performed in the eighth embodiment.

FIG. 16 is a diagram illustrating the first half of the flowchart to express the write processing of the data desirous of holding into the SSD, performed in the eighth embodiment. Further, FIG. 17 is a diagram illustrating the latter half of the flowchart.

Figure 17:
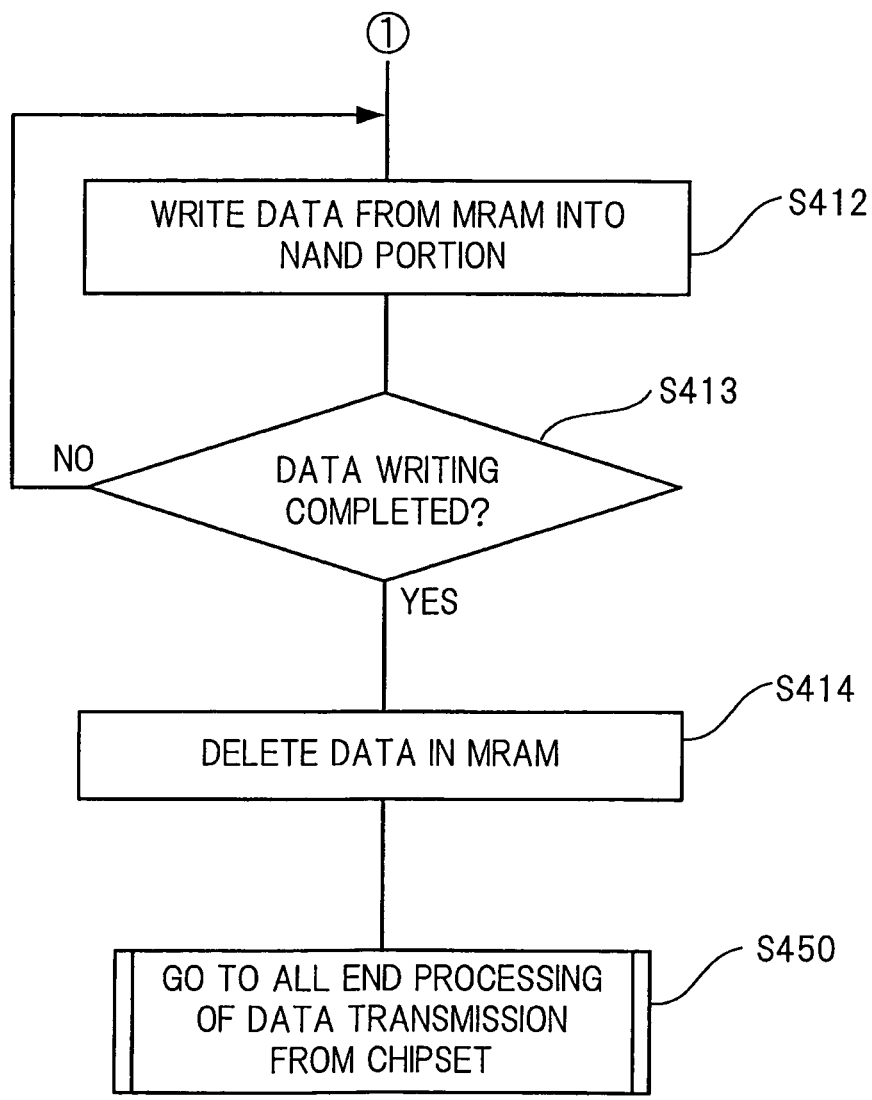
FIG. 17 is a diagram illustrating the latter half of the flowchart to express write processing of the data desirous of holding into the SSD, performed in the eighth embodiment.

When the write processing illustrated in the flowcharts of FIGS. 16, 17 starts, at first the second chipset 340 turns on the power source of the SSD 420 (step S401).

Then, the control section 421 of the SSD 420 confirms whether or not the data desirous of holding is left in the buffer area 411 by referring to a management table managing a storage situation of data in each memory of the SSD 420 (step S402).

This confirmation in this step S402 has the following meaning.

In the eighth embodiment, a last data storage into the NAND-type flash memory 321 is storage of the data desirous of holding that is temporarily accumulated in the buffer area 411. In the management table referred to in step S402, whether or not the data storage in the buffer area 411 into the NAND-type flash memory 321 is finished is recorded as a flag. In other words, whether there is the data desirous of holding remaining in the buffer area 411 or not is recorded as a flag in the management table. In this embodiment, as described above, the data desirous of holding that remains in the buffer area 411 of the main memory 410 at the time of shutting off the power source is left in the buffer area 411 due to the nonvolatile property of the MRAM included in the main memory 410.

Here, in step S402, assuming that it is confirmed that the data desirous of holding remains in the buffer area 411. This means that the data desirous of holding that is not yet stored at the time of shutting off the power source is left in the buffer area 411 in the write processing performed at the previous power-on. On the other hand, assuming that it is confirmed that the data desirous of holding do not remain in the buffer area 411. This means that the write processing last time is entirely completed including the storage of the data desirous of holding in the buffer area 411.

In other words, in step S402, it is confirmed whether there is the data desirous of holding that is not yet stored into the NAND-type flash memory 321 remains in the buffer area 411.

If there is the data desirous of holding that is not yet stored remaining in the buffer area 411, the control section 421 of the SSD 420 stores the data desirous of holding that is not yet stored and remaining in the buffer area 411, into the NAND-type flash memory 321 (step S403).

In the eighth embodiment, the storage of the data desirous of holding in the buffer area 411 into the NAND-type flash memory 321 is performed while designating a certain amount of data as one unit. In the flowchart here, when the one unit of the data desirous of holding in the buffer area 411 is stored, the storage of the data desirous of holding is finished temporarily. When the storage is finished in this manner, by the control section 421, it is determined whether or not all the storage of the data desirous of holding is finished by the storage of the one unit of the data desirous of holding this time (step S404).

If determined that the storage of the data desirous of holding that is not yet stored is not yet finished (NO judgment in step S404), the procedure returns to step S403 to perform storing of a next unit of the data desirous of holding. Namely, in the flowcharts here, until when all the data desirous of holding that is not yet stored is completely stored (YES judgment in step S404), the storage of the data desirous of holding is repeated. Thereafter, when all the storage of the data desirous of holding that is not stored is finished, the control section 421 erases the data desirous of holding in the buffer 411 (step S405), and proceeds to next step S406.

On the other hand, in step S402, if it is confirmed that the data desirous of holding is not left in the buffer 411, the processing from step S303 through S305 is omitted to proceed to step S406.

In step S406, the control section 421 of the SSD 420 refers to the SPD information of the main memory 410 to determine whether or not the buffer area 411 is secured in the reserve area of the main memory 410. If determined that the buffer area 411 is not secured (NO judgment in step S406), the control section 421 of the SSD 420 performs processing like the following. Namely, in this case, the control section 421 secures the buffer area 411 within the reserve area of the main memory 410 (step S407). Further, an address or the like of the secured buffer area 411 is described in the SPD information.

On the other hand, if determined that the buffer area 411 is secured (YES judgment in step S406), the processing of step S407 is omitted to proceed to next step S408.

In this step S408, the second chipset 340 starts inputting the data desirous of holding to the SSD 420.

Then, the control section 421 receives the data desirous of holding, refers to the SPD information to confirm the address of the buffer area 411 and stores the data desirous of holding into the buffer area 411 (step S409).

Here, storing one file of the data desirous of holding is performed while designating a certain amount of data as one unit. In the flowchart here, after the one unit of the data desirous of holding is stored, the storage is temporarily finished (step S410). Then, by the control section 421 of the SSD 420, it is determined whether or not a certain amount of the data desirous of holding is accumulated in the buffer area 411 by the storage of the one unit of the data desirous of holding this time (step S411).

If determined that the certain amount of the data desirous of holding is not accumulated yet (NO judgment in step S411), the procedure returns to step S409 to perform storing of a next one unit of the data desirous of holding. That is, in the flowchart here, until when the certain amount of the data desirous of holding is accumulated in the buffer area 411, the storage of the data desirous of holding is repeated (YES judgment in step S411).

If the certain amount of the data desirous of holding is accumulated in the buffer area 411, the control section 421 of the SSD 420 reads out the accumulated data desirous of holding from the buffer area 411 and stores into the NAND-type flash memory 321 (step S412). Additionally, the storage of the data desirous of holding into the NAND-type flash memory 321 is performed while designating a certain amount of data as one unit as well. And when the one unit of the data desirous of holding is stored into the NAND-type flash memory 321, it is determined whether or not the storage is finished for all the data desirous of holding accumulated in the buffer area 411, by the control section 421 of the SSD 420 (step S413).

If determined that the storage is not yet finished (NO judgment in step S413), the procedure returns to step S412 to perform storing of a next one unit of the data desirous of holding.

On the other hand, if determined that the storage is finished for all the certain amount of the data desirous of holding (YES judgment in step S413), the control section 421 of the SSD 420 performs processing like the following (step S414). Namely, in this case, the control section 421 performs erasure of the certain amount of the data desirous of holding stored in the buffer 411 this time.

When the erasure of the data desirous of holding is finished, subsequently, all end processing (step S450) that will be explained below is performed.

Note that, here, the all end processing is essentially independent processing, which is performed in parallel with the write processing explained up to here. However, in the present embodiment, the all end processing is also utilized as a subroutine of the write processing, which is performed through the above-described step S414.

Figure 18:
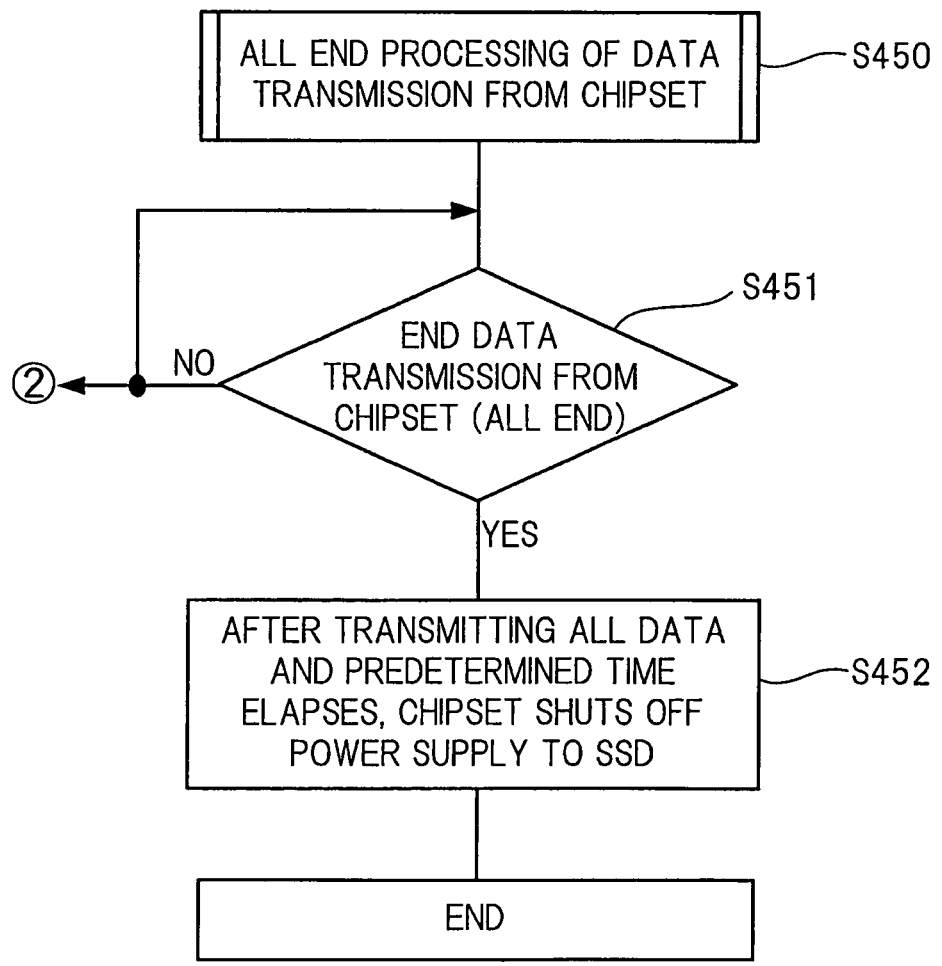
FIG. 18 is a flowchart illustrating all end processing.

FIG. 18 is a flowchart illustrating the all end processing.

Here, firstly, explanation will be made about a case in which this all end processing (step S450) is performed as a subroutine through step S414 of the write processing.

First of all, the second chipset 340 determines whether or not the storage of all the data desirous of holding constituting this file into the SSD 420 is finished (step S451).

If determined that the storage is not yet finished (NO judgment in step S451), the procedure returns to step S408 of FIG. 16. Then the write processing is continuously performed.

On the other hand, if determined that the storage of all the data desirous of holding is finished (YES judgment in step S451), the second chipset 340 shuts off the power source of the SSD 420 after waiting a predetermined time to elapse since the completion of the storage of the data desirous of holding into the SSD 420 (step S452).

At this time, if the access to the main memory 410 is finished, then in step S452, the power source of the main memory 410 is also shut off by the power supply control section.

With the shut off of the power source in step S452 explained in the above, the all end processing of FIG. 18 and the write processing of FIGS. 16, 17 are finished.

Subsequently, a case in which the all end processing (step S450) is performed in parallel with the write processing, independent of the write processing will be explained.

In this case, the processing of step S451 is monitoring processing of data input per se by the second chipset 340 per a certain time period. At this time, even if it is determined that the data input is not finished, the procedure does not return to step S408 of FIG. 16 as in the above and only the monitoring is continued.

Here, explanation will be made about a situation in which the all end processing is performed independently of the write processing and the data input is determined to be finished in step S451.

As described above, the input of one file of the data desirous of holding from the second chipset 340 into the SSD 420 is performed while designating a certain amount of data as one unit. At this time, among plural units of the data that belong to this file and that are stored in order, the all end processing functions as a subroutine for the unit data immediately before the last unit data. And in that case, the procedure always returns to step S408 of FIG. 16 by the determination in step S451 of FIG. 18.

However, when the last unit data is inputted from the second chipset 340 into the SSD 420, it is determined that the data input is finished in the processing of step S451 of FIG. 18 at a time point when the processing of step S451 of FIG. 18 is finished. Besides, at this time, since the processing of step S414 of FIG. 17 is not performed yet, there is the last unit data that is not yet stored still remaining in the buffer area 411. The data desirous of holding remaining in the buffer area 411 is left in the buffer area 411, due to the nonvolatile property of the buffer area 411, after the shut off the power of the main memory 410.

The last unit data left in the buffer area 411 in this manner is stored into the NAND-type flash memory 420 by the processing of step S403 of FIG. 16 when the second chipset 340 starts data input next.

It is needless to say that also by the eighth embodiment explained in the above, high-speed and power saving are realized at the same time in storing data, like the fourth embodiment.

Here, deviating from the explanation of a concrete embodiment of the above-described basic mode, and another example using the MRAM will be described.

Figure 19:
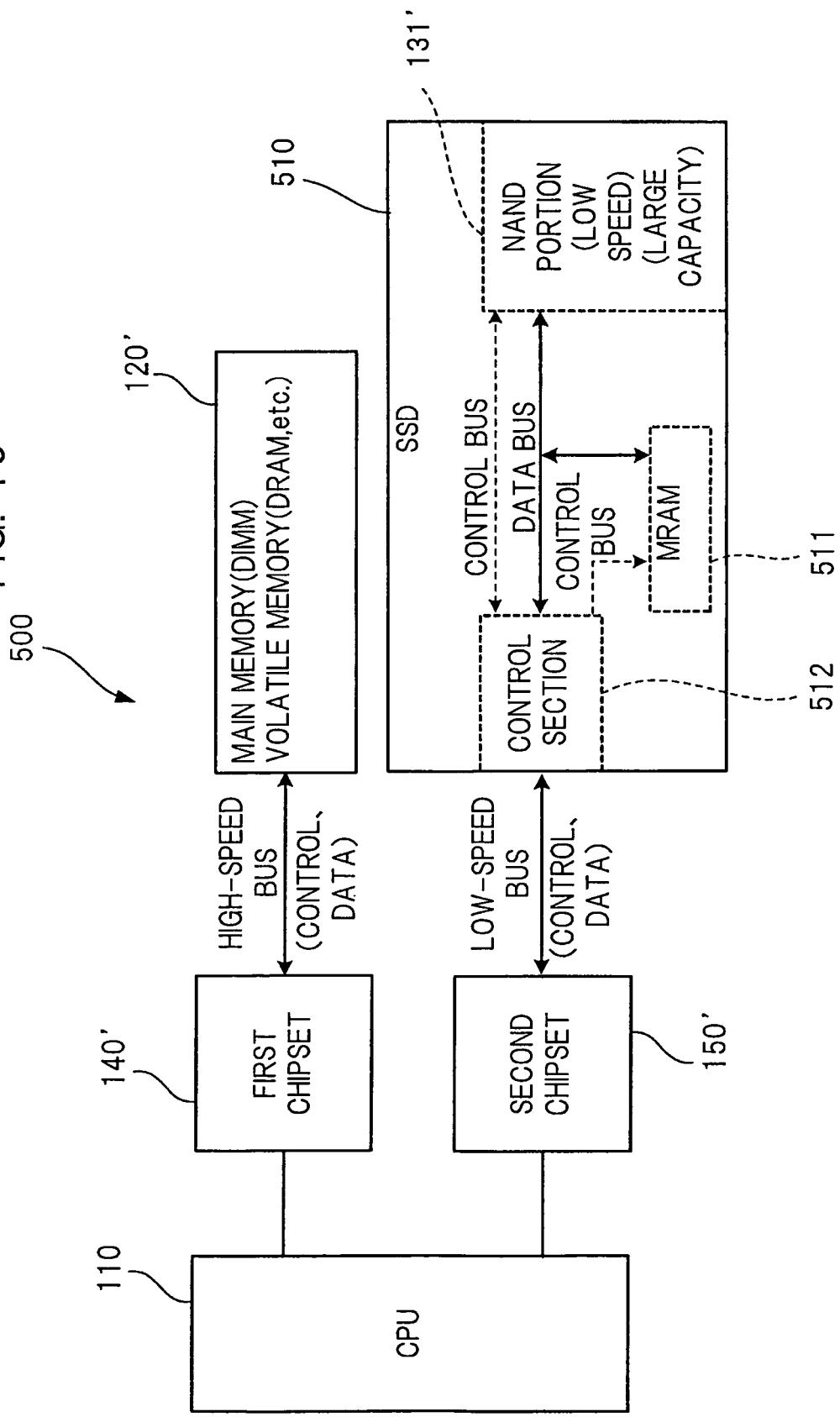
FIG. 19 is a diagram illustrating another example using a MRAM.

FIG. 19 is a diagram illustrating another example using the MRAM.

A computer 500 illustrated in FIG. 19 is basically the one in which the DRAM 133' mounted in the SSD 130' of the comparative example explained with reference to FIG. 5 as a dedicated buffer is changed to a MRAM 511.

In this another example, a control section 512 of a SSD 510 stores the data desirous of holding received from the second 150' chipset into the NAND-type flash memory 131' via the MRAM 511 that is a dedicated buffer.

On the other hand, the main memory 120' is a memory independent of the SSD 130' like the comparative example, and the first chipset 140' exchanges data only with this main memory 120'.

Hereafter, write processing of the data desirous of holding into the SSD 510 performed in this another example illustrated in FIG. 19 will be described.

Figure 20:
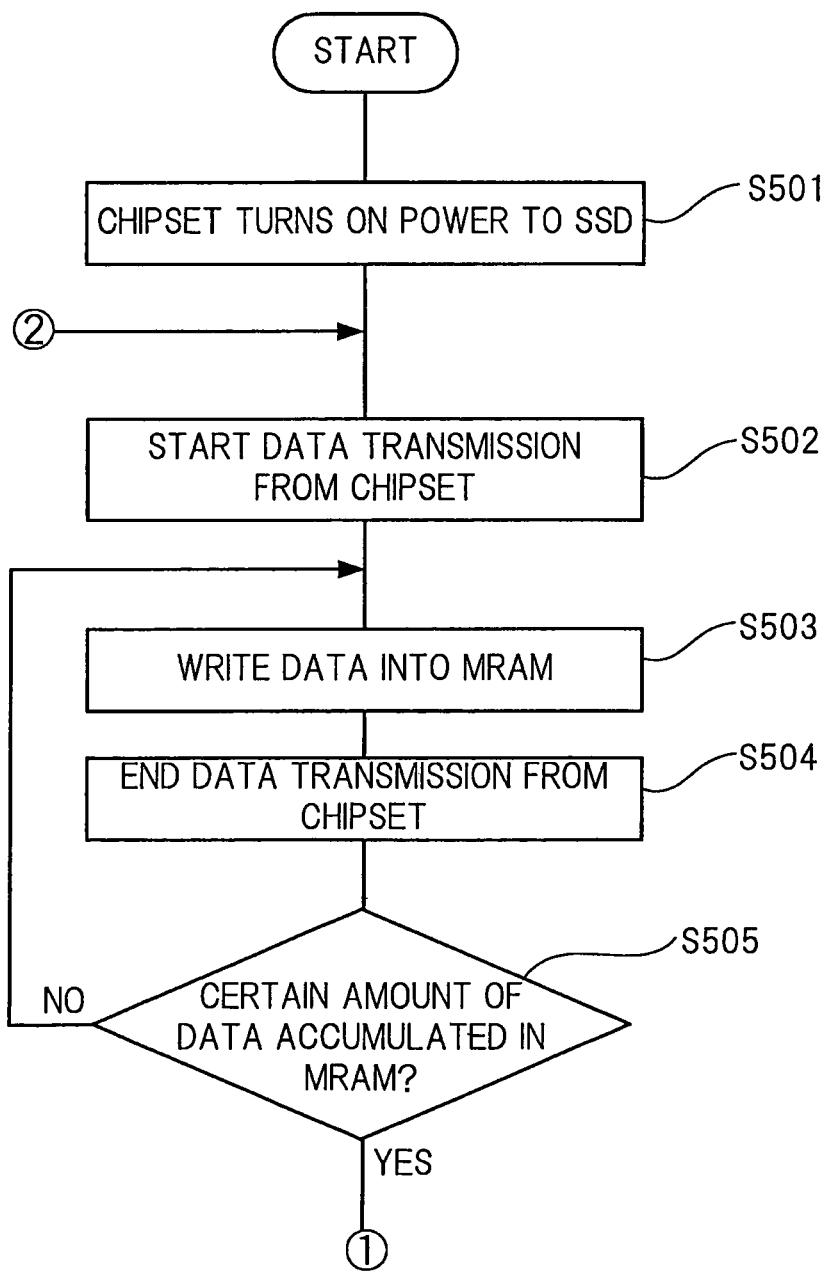
FIG. 20 is a diagram illustrating the first half of the flowchart to express write processing of data desirous of holding into a SSD, performed in the another example.

FIG. 20 is a diagram illustrating the first half of the flowchart to express the write processing of the data desirous of holding into the SSD, performed in the another example. Further, FIG. 21 is a diagram illustrating the latter half of this flowchart.

Figure 21:
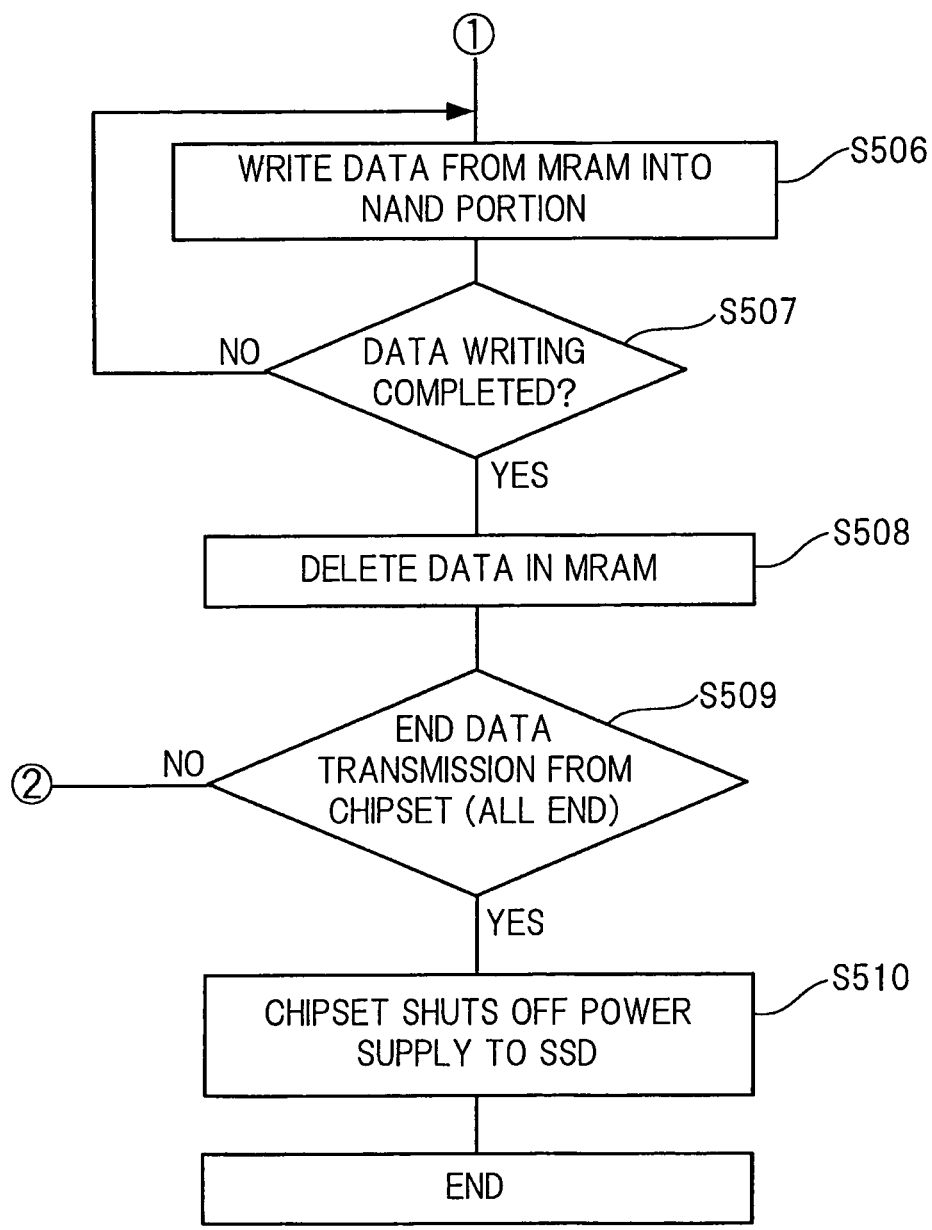
FIG. 21 is a diagram illustrating the latter half of the flowchart to express write processing of the data desirous of holding into the SSD, performed in the another example.

When the write processing illustrated in the flowcharts of FIGS. 20, 21 starts, at first the second chipset 150' turns on the power source of the SSD 510 (step S501).

Subsequently, the second chipset 150' starts inputting the data desirous of holding into the SSD 510 (step S502). Then, the control section 512 receives the data desirous of holding and stores into the MRAM 511 that is a dedicated buffer (step S503).

Here, inputting one file of data is performed while designating an amount of data as one unit. In the flowchart here, after the one unit of the data desirous of holding is inputted from the second chipset 150', the input from the second chipset 150' is temporarily finished (step S504). After the input of data is finished, then by the control section 512, it is determined whether or not a certain amount of the data desirous of holding is accumulated in the MRAM 511 by the storage of the one unit of the data desirous of holding this time (step S505).

If determined that the certain amount of the data desirous of holding is not accumulated yet (NO judgment in step S505), the procedure returns to step S503 to perform storing of a next one unit of the data desirous of holding. That is, in the flowchart here, until when the certain amount of the data desirous of holding is accumulated in the MRAM 511, the storage of the data desirous of holding is repeated (YES judgment in step S505).

If the certain amount of the data desirous of holding is accumulated in the MRAM 511, the control section 512 of the SSD 510 reads out the accumulated data desirous of holding from the MRAM 511 and stores into the NAND-type flash memory 131' (step S506). Additionally, the storage of the data desirous of holding into the NAND-type flash memory 131' is performed while designating a certain amount of data as one unit as well. And when the one unit of the data desirous of holding is stored into the NAND-type flash memory 131', it is determined whether or not the storage is finished for all the data desirous of holding accumulated in the MRAM 511, by the control section 512 of the SSD 510 (step S507).

If determined that the storage is not yet finished (NO judgment in step S507), the procedure returns to step S506 to perform storing of a next one unit of the data desirous of holding.

On the other hand, if determined that the storage is finished for all the certain amount of the data desirous of holding (YES judgment in step S507), the control section 512 of the SSD 510 performs processing like the following (step S508). Namely, in this case, the control section 512 performs elimination of the certain amount of the data desirous of holding stored in the NAND-type flash memory 131' this time from the MRAM 511.

When processing of this step S508 is finished, the second chipset 150' determines whether or not the storage of all the data desirous of holding constituting this file into the SSD 510 is finished (step S509).

If determined that the storage is not yet finished (NO judgment in step S509), the procedure returns to the write processing in step S502 of FIG. 20. Then the write processing is continuously performed.

On the other hand, if determined that the storage of all the data desirous of holding is finished (YES judgment in step S509), the second chipset 150' shuts off the power source of the SSD 510 (step S510) after the determination. At that time, if the access to the main memory 120' is finished, the power source of the main memory 120' is also shut off by the power source control section. With the shutting of the power source in this step S510, the write processing of FIGS. 20, 21 is finished.

As explained above, in the another example, the storage of the data desirous of holding into the NAND-type flash memory 131' of the SSD 510 is performed while making the MRAM 511 as the dedicated buffer. Also in the another example, the shutting off the power source is performed after confirming that the entire data desirous of holding belonging to one file is stored into the NAND-type flash memory 131'. With this, in the another example, the power source of the SSD 510 is shut off without leaving out the data desirous of holding that is not yet stored.

Next, a ninth embodiment will be explained.

This ninth embodiment is a modified example of the seventh embodiment in which the data desirous of holding is stored into the NAND-type flash memory via the buffer area of the main memory and the flash memory. The ninth embodiment is different from the seventh embodiment in that the data inputted from one chipset is distributed into the main memory and the NAND-type flash memory by the control section of the SSD. Hereafter, the ninth embodiment will be explained with a focus on this different point.

Figure 22:
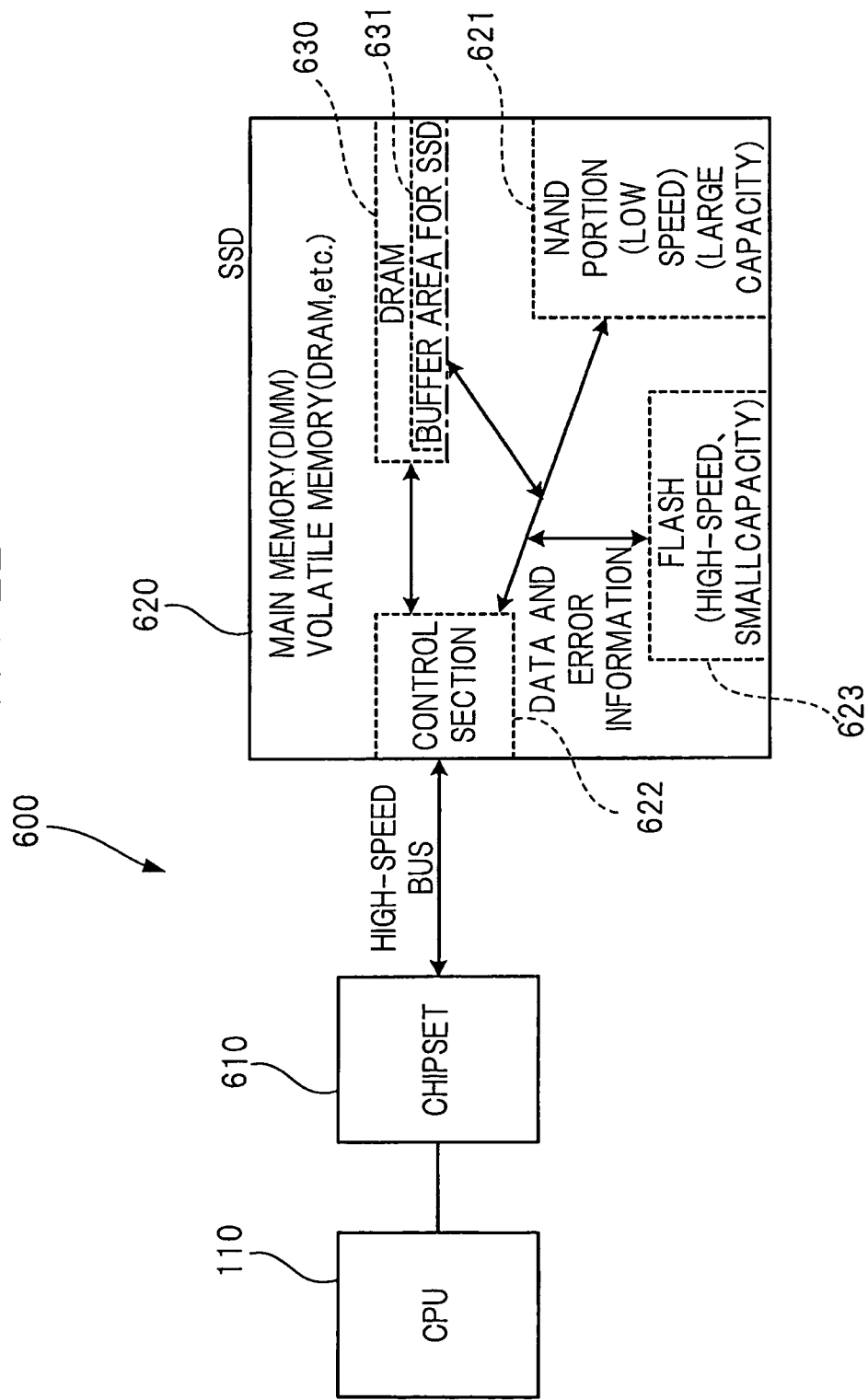
FIG. 22 is a schematic diagram illustrating a ninth embodiment.

FIG. 22 is a schematic block diagram illustrating the ninth embodiment.

Incidentally, in this FIG. 22, the same numeral "110" as in FIG. 4 is given to a CPU that is equivalent to the CPU 110 of the fourth embodiment illustrated in FIG. 4, which is a constituent element of a computer 600.

The computer 600 of this FIG. 22 has one chipset 610 and a SSD 620.

Further, in the SSD 620, a main memory 630 that is a DIMM having a DRAM is mounted. In a reserve area of the main memory 630, a buffer area 631 for a NAND-type flash memory 621 is set.

The chipset 610 inputs both the temporary used data and the data desirous of holding into the control section 622 of the SSD 620. Here, in this embodiment, the chipset 610 attaches an identifier to data indicating the data is either the temporary used data or the data desirous of holding, and inputs the data with the identifier into the control section 622.

If the identifier of the data inputted from the chipset 610 indicates the temporary used data, the control section 622 of the SSD 620 stores the data into the primary storage area of the main memory 630. Further, if the identifier indicates the data desirous of holding, the control section 622 of the SSD 620 stores the data into the NAND-type flash memory 621 through the buffer area 631 of the main memory 630 and the flash memory 623.

Here, each address of the primary storage area of the main memory 630, the reserve area of main memory 630 and the buffer area 631 is described in the SPD information of the main memory 630 like the other embodiments. When transmitting data to the main memory 630, the control section 622 of the SSD 620 refers to the SPD information to confirm each area. And the control section 622 stores the data into either the buffer area 631 or the primary storage area thus confirmed, according to content indicated by the identifier of the data.

Also in this ninth embodiment, similarly as in the seventh embodiment, the processing of shutting off the power source of the SSD 620 is performed independently of the end of data input into the NAND-type flash memory 621. The data desirous of holding remaining in the buffer area 631 at the time of the shut off of the power source is evacuated to the flash memory 623.

In the ninth embodiment, a combination of the main memory 630 and the SSD 620 in FIG. 22 corresponds to a concrete embodiment of the memory system.

In the ninth embodiment, the main memory 630 of FIG. 22 corresponds to an example of the first memory in the basic mode.

Furthermore, in the ninth embodiment, the NAND-type flash memory 621 of the SSD 620 of FIG. 22 corresponds to an example of the second memory in the basic mode. Moreover, in the ninth embodiment, the control section 622 of the SSD 620 of FIG. 22 corresponds to an example of both the securing section and the memory control section in the basic mode. Additionally, in the ninth embodiment, the flash memory 623 corresponds to an example of the third memory in the above-described application mode including the third memory. Further, in the ninth embodiment, the control section 622 of the SSD 620 of FIG. 22 also corresponds to an example of the memory control section in the above-described application mode in which the memory control section receives the input of the first data.

In the ninth embodiment, the control section 622 of the SSD 620 distributes data according to an identifier attached to the data. With this, in the ninth embodiment, there are less constitute elements in the memory system, realizing simplification of the structure.

This means that an application mode to be described later is more preferable to the above-described application mode in which the memory control section also receives an instruction of writing data into the first memory. In this more preferable application mode, the above-described memory control section receives input of data attached with an identifier selected out of the first identifier and the second identifier. Further in this more preferable application mode, the memory control section handles the data attached with the first identifier as the data to be written into the first memory and handles the data attached with the second identifier as the data to be written into the second memory.

The control section 622 of the SSD 620 in the ninth embodiment also corresponds to an example of the memory control section in this more preferable application mode.

Hereafter, the write processing that is performed in the ninth embodiment illustrated in this FIG. 22 will be explained.

Note that, in each embodiment from the first to the fifth explained up to here, explanation is made, as the write processing, only for the write processing in which the data desirous of holding is stored into the SSD through the buffer area, by the control section of the SSD.

In contrast to this, in the ninth embodiment, the write processing to both the main memory and the SSD will be explained. This is because in the ninth embodiment, the control section 622 of the SSD 620 is responsible for both the storage of temporary used data into the main memory and the storage of the data desirous of holding into the SSD, and these storages are performed according to one flowchart.

Figure 23:
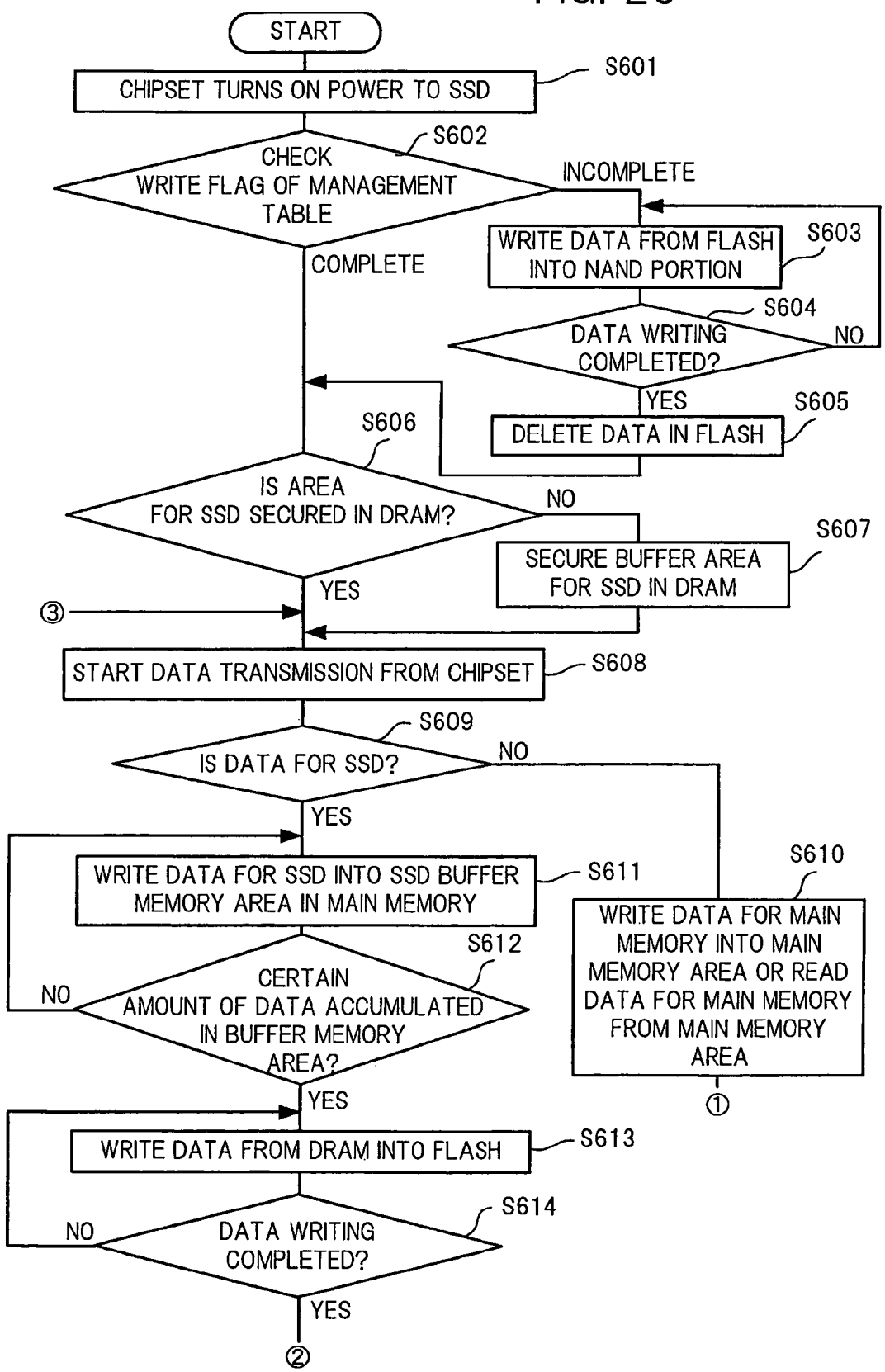
FIG. 23 is a diagram illustrating the first half of the flowchart to express write processing performed in the ninth embodiment.
Figure 24:
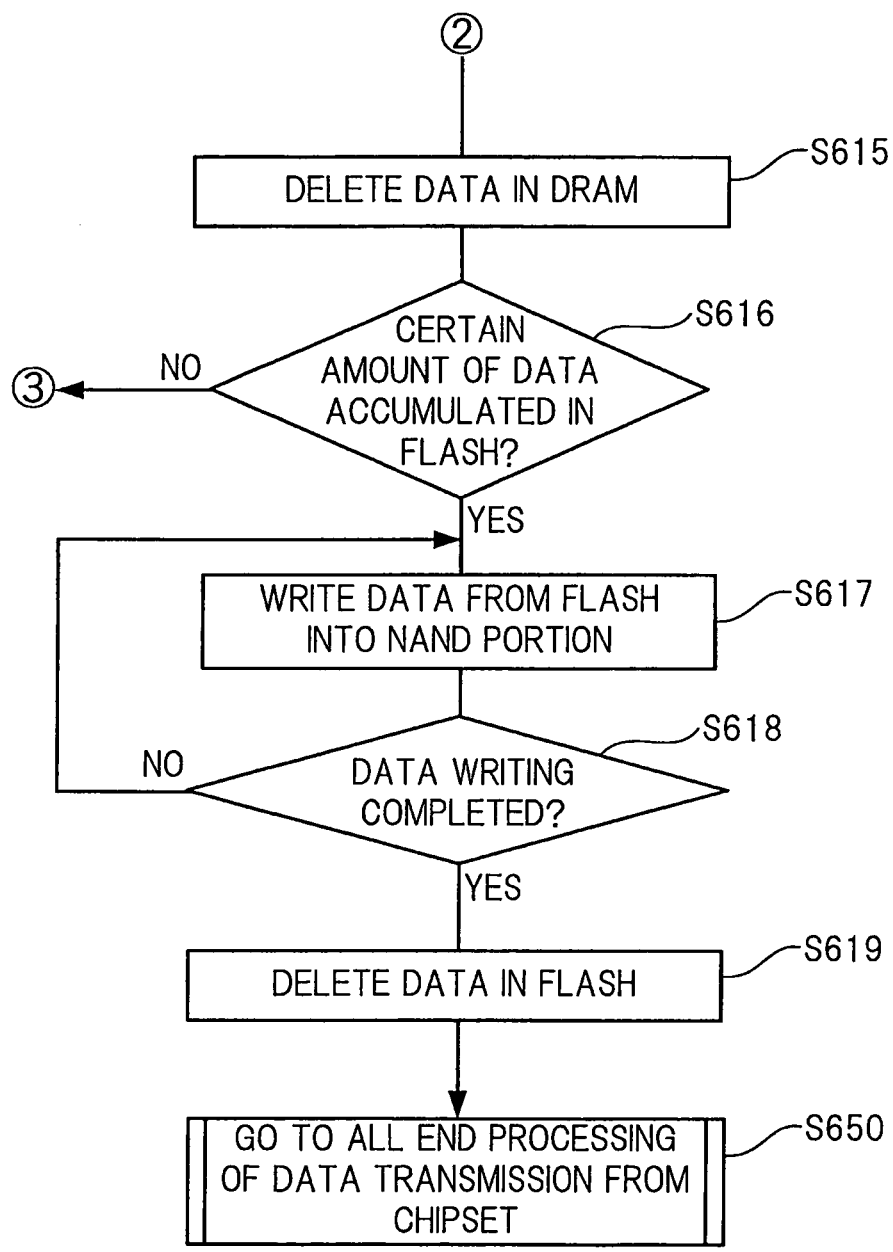
FIG. 24 is a diagram illustrating the latter half of the flowchart to express write processing performed in the ninth embodiment.

FIG. 23 is a diagram illustrating the first half of the flowchart expressing the write processing performed in the ninth embodiment. FIG. 24 is a diagram illustrating the latter half of this flowchart.

When the write processing illustrated in the flowchart's in FIGS. 23, 24 starts, at first the chipset 610 turns on power to the SSD 620 (step S601).

Then, the control section 622 of the SSD 620 confirms whether or not the data desirous of holding that is not yet stored at the previous power shut off remains in the flash memory 623, by referring to a management table that manages a storage situation of data in each memory (step S602).

When there is the data desirous of holding that is not yet stored remaining in the flash memory 623, the control section 622 of the SSD 620 stores the data desirous of holding in the flash memory 623 into the NAND-type flash memory 621 (step S603).

Next, by the control device 622, it is determined whether or not all the storage of the data desirous of holding that is not stored is finished by the storage of this time (step S604).

If determined that the storage of the data desirous of holding that is not stored is not yet finished (NO judgment in step S604), the procedure returns to step S603 to perform the storage of next data desirous of holding. This storage of the data desirous of holding is repeated until all the data desirous of holding that is not stored is stored (YES judgment in step S604). When all the storage of data desirous of holding of the non-storage is finished, the control section 622 deletes the data desirous of holding in the flash memory 623 (step S605), and proceeds to next step S606.

On the other hand, in step S602, if it is confirmed that the data desirous of holding is not left in the flash memory 623, the processing from the step S603 through the step S606 is omitted to proceed to step S606.

In step S606, the control section 622 of the SSD 620 refers to the SPD information of the main memory 630 to determine whether or not the buffer area 631 is secured in the reserve area of the main memory 630. When determined that that buffer area 631 is not secured (NO judgment in the step S606), the control section 622 secures the buffer area 631 in the reserve area of the main memory 630 (step S607). Also, the address of the secured buffer area 631 and the like is described in the SPD information.

On the other hand, when determined that the buffer area 631 is secured (YES judgment in the step S606), the processing of step S607 is omitted to proceed to next step S608.

In this step S608, the chipset 610 starts inputting data to the SSD 620.

Then, the control section 622 receives data from the chipset 610 and refers to an identifier of the data to determine whether or not the data is the data desirous of holding (step S609).

If determined that it is not the data desirous of holding (NO judgment in step S609), the data is temporary use data. Therefore, in this case, the control section 622 stores the temporary used data into the primary storage area whose location is confirmed by referring to the SPD information (step S610). This temporary used data is temporarily stored into the main memory 630 assuming that it is immediately read out in program processing in the CPU 110 and the like. In step S610 of FIG. 23, read out of data that is stored as described above, from the main memory 630 by the control section 622 is also performed. The temporary used data that is read out is transmitted to the CPU 110 via the control section 622 and the chipset 610.

When the processing of this step S610 is finished, a part of all end processing (step S650) that will be described later, which also functions as a subroutine of the write processing of FIG. 23 and FIG. 24 is performed. The processing following this step S610 will be explained later along with the explanation of the all end processing.

If determined in the processing of step S609 that the data is the data desirous of holding (YES judgment in step S609), the control section 622 stores the data desirous of holding in the buffer area 631 whose location is confirmed by referring to the SPD information (step S611).

Then, by the control section 622, it is determined whether or not a certain amount of the data desirous of holding is accumulated in the buffer area 631 by the storage of the data desirous of holding this time (step S612).

If determined that the certain amount of the data desirous of holding is not accumulated yet (NO judgment in step S612), the procedure returns to step S611 to perform storing of a next one unit of the data desirous of holding. The storage of the data desirous of holding is repeated until when the certain amount of the data desirous of holding is accumulated in the buffer area 631 (YES judgment in step S612).

If the certain amount of the data desirous of holding is accumulated in the buffer area 631, the control section 622 of the SSD 620 reads out the accumulated data desirous of holding from the buffer area 631 and stores into the flash memory 623 (step S613).

Subsequently, by the control section 622 of the SSD 620, it is determined whether or not the storage into the flash memory 623 is finished for all the certain amount of the data desirous of holding accumulated in the buffer area 631, by the storage of the data desirous of holding this time (step S614).

If determined that the storage is not yet finished (NO judgment in step S614), the procedure returns to step S613 to perform a next storing of the data desirous of holding.

On the other hand, if determined that the storage is finished for all the certain amount of the data desirous of holding (YES judgment in step S614), the control section 622 deletes the data desirous of holding stored in the buffer area 631 (step S615).

When the deletion of the data desirous of holding is finished, subsequently, the control section 622 of the SSD 620 determines whether or not an amount of the data desirous of holding that is accumulated in the flash memory 623 up to this processing is beyond the certain threshold (step S616).

If determined that the amount of the data desirous of holding accumulated in the flash memory 623 does not exceed the threshold (NO judgment in step S315), the procedure returns to step S608 to again perform the storage of the data desirous of holding into the buffer area 631 and the flash memory 623.

If determined that the amount of the data desirous of holding accumulated exceeds the threshold (YES judgment in step S616), the control section 622 stores the data desirous of holding in the flash memory 323 into the NAND-type flash memory 621 (step S617).

Subsequently, by the control section 622, it is determined whether or not all the data desirous of holding in the flash memory 623 is stored into the NAND-type flash memory 621 by the storage of the data desirous of holding this time (step S618).

If determined that the storage of the data desirous of holding is not yet finished (NO judgment in step S618), the procedure returns to step S617 to store the next data desirous of holding. This storage is repeated until all the data desirous of holding in the flash memory 623 is stored in the NAND-type flash memory 621 (YES judgment in step S618). When all the storage of the data desirous of holding is finished, the control section 622 erases the data desirous of holding in the flash memory 623 (step S619), and all end processing is performed (step S650).

Here, the all end processing is performed in parallel with the write processing explained up to here, and is essentially independent processing. However, in the present embodiment, the all end processing is also utilized as a subroutine of the write processing, which is performed through the above-described step S610 or S619.

Figure 25:
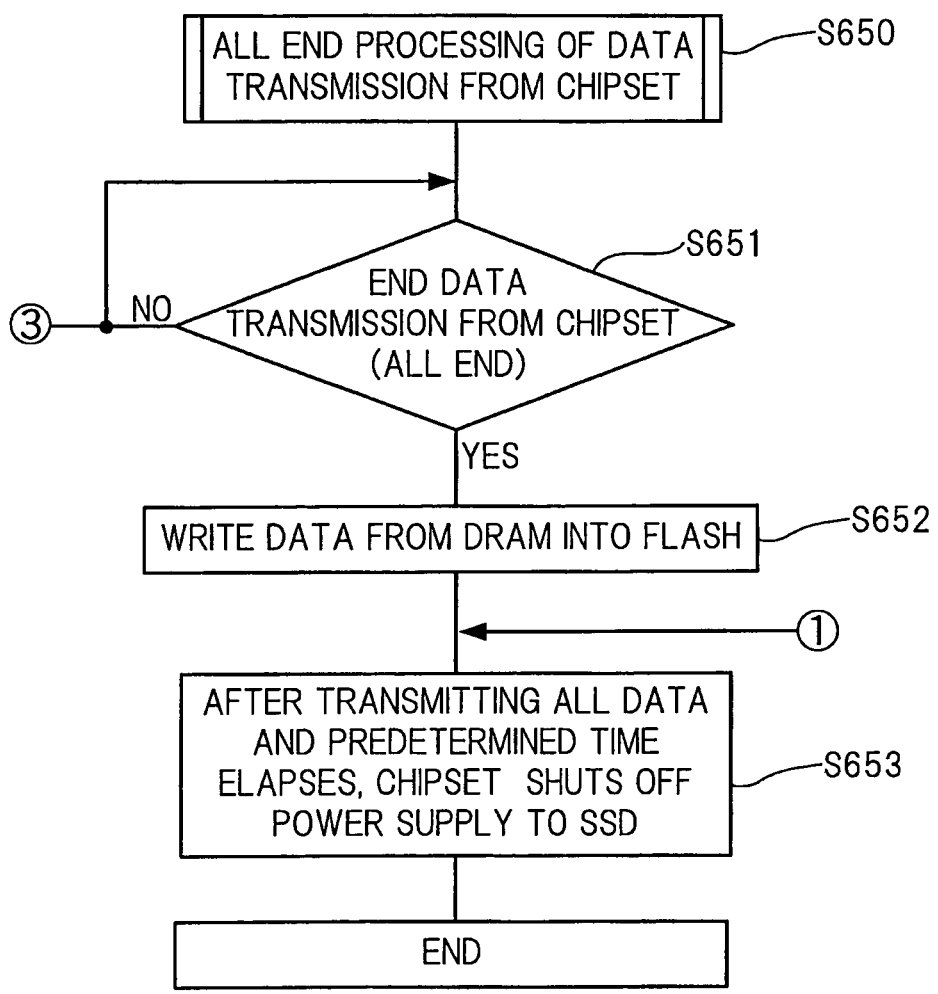
FIG. 25 is a flowchart illustrating all end processing.

FIG. 25 is a flowchart illustrating the all end processing.

Here, firstly, explanation will be made about a case in which this all end processing (step S650) is performed as a subroutine through step S619 of the write processing.

First of all, the chipset 610 determines whether or not the storage of all the data desirous of holding constituting this file into the SSD 620 is finished (step S651).

If determined that the storage is not yet finished (NO judgment in step S651), the procedure returns to the write processing in step S608 of FIG. 23. Then the write processing is continuously performed.

On the other hand, if determined that the storage of all the data desirous of holding is finished (YES judgment in step S651), the control section 622 of the SSD 620 stores the data desirous of holding in the buffer area 631 of the main memory 630 into the flash memory 623 (step S652). However, when this all end processing is performed through step S619 of the write processing, the data desirous of holding in the buffer area 631 is deleted in step S615 of FIG. 24. Because of this, in step S652 of FIG. 25 substantially nothing is performed and the procedure proceeds to next step S653.

In this step S653, the chipset 610 shuts off the power source of the SSD 620 after waiting for a predetermined time to elapse from the completion of the storage of all the data desirous of holding into the SSD 620, and finishes the all end processing in FIG. 25 including the write processing.

Explanation will be made about a case in which this all end processing (step S650) is performed as a subroutine through step S610 of the write processing.

The processing of the write processing in step S610 is processing in which the temporary used data is processed at a high-speed in the main memory 630 at a storage speed of DRAM. In the processing of step S610, data input and storage is performed at a high-speed for the temporary used data and finishes immediately. Moreover, the storage of the temporary used data is directly performed to the main memory 630 without going through the buffer area.

Because of this, if the all end processing (step S650) is performed through this step S610, the confirmation of the end of data input in step S651 and the data input into the flash memory 623 in step S652 are omitted. Following step S610, the shut off of the power is performed in step S653, and the all end processing in this FIG. 25 is finished including the write processing.

Next, explanation will be made about a case in which this all end processing (step S650) is performed in parallel with the write processing, independently of the write processing.

In this case, the processing of step S651 is monitoring processing of data input per se by a chipset 610 per a certain time period. At this time, even if it is determined that the data input is not finished, the procedure does not return to step S608 of FIG. 23 as in the above and only the monitoring is continued.

Then the last data input from the chipset 610 to the SSD 620 is finished, in step S651, the control section 622 of the SSD 620 determines that the data input is finished (YES judgment in step S651).

In the ninth embodiment, in this case, the last data desirous of holding still remaining in the buffer area 631 is evacuated to the flash memory 623 before the power-off processing in step S653.

The last data desirous of holding that is evacuated in this manner is transmitted to the NAND-type flash memory 621 by the processing of step S603 of FIG. 23, when the second chipset 610 starts inputting data.

It is needless to say that also by the ninth embodiment explained above, high-speed and power saving are realized at the same time in storing data, like the fourth embodiment.

Next, a tenth embodiment will be explained.

The tenth embodiment is different from the ninth embodiment in that the storage of the data desirous of holding into the NAND-type flash memory is performed through only the buffer area in the main memory having a MRAM. Hereafter, the tenth embodiment will be explained with a focus on this different point.

Figure 26:
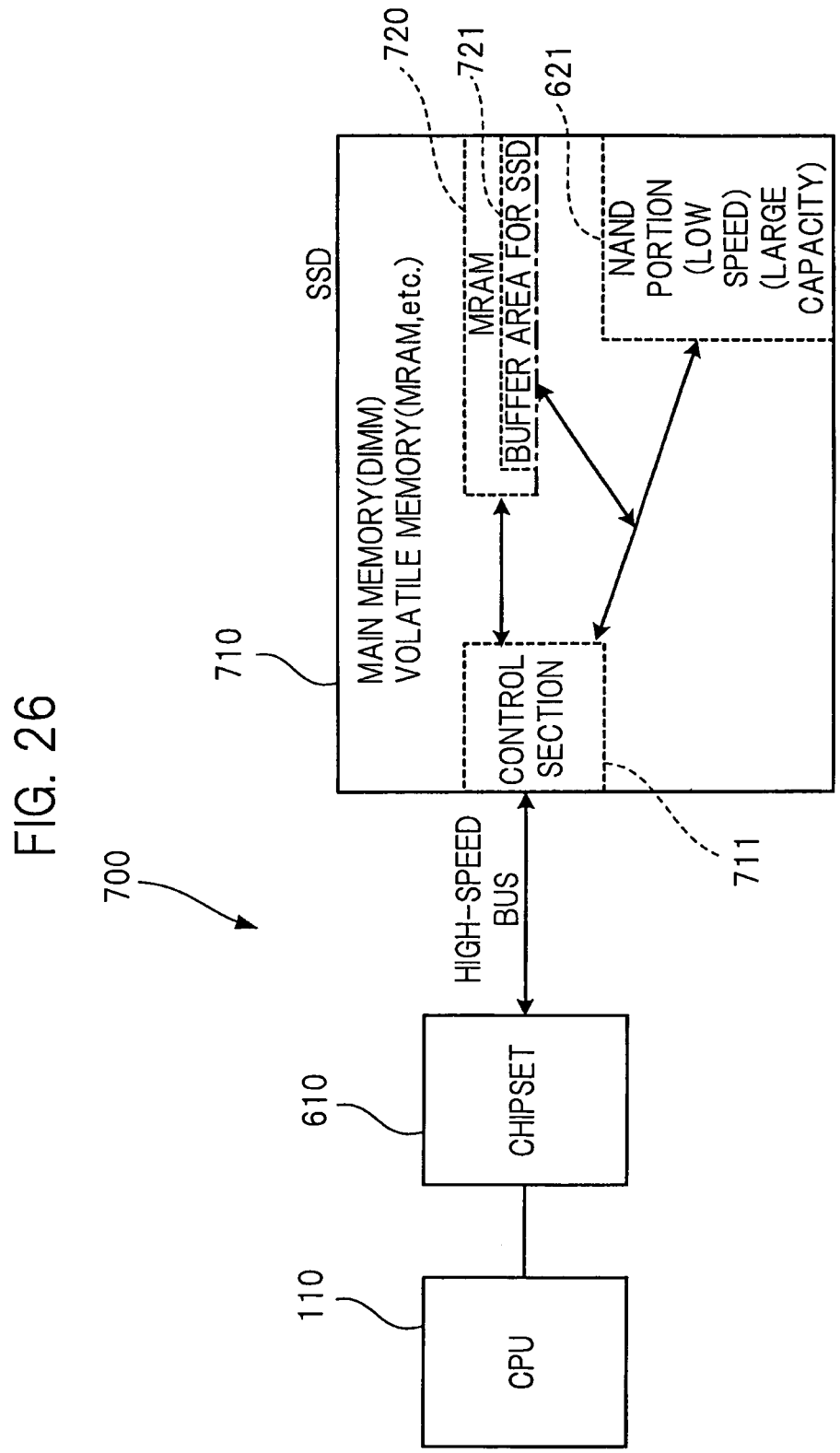
FIG. 26 is a schematic diagram illustrating a tenth embodiment.

FIG. 26 is a schematic diagram illustrating the tenth embodiment.

Incidentally, in this FIG. 26, constituent elements that are equivalent to those in FIG. 22 illustrating the computer 600 of the ninth embodiment are referred to by the same numerals in FIG. 22 and redundant explanation of those equivalent constituent elements is omitted.

In a computer 700 of this FIG. 26, if the identifier attached to the data received from the chipset 610 indicates the data desirous of holding, the control section 711 performs the following processing. In this case, the control section 711 transmits the data desirous of holding to the NAND-type flash memory 621 only through a buffer area 721 in a main memory 720 having the MRAM.

Moreover, in the tenth embodiment, a structure without having a flash memory to evacuate the last data desirous of holding is employed. Therefore, in the tenth embodiment, after the completion of the storage of the last data desirous of holding from the buffer area 721 into the NAND-type flash memory 621 is confirmed, the power-off processing of the SSD 710 is performed.

In the tenth embodiment, a combination of the main memory 720 and the SSD 710 of FIG. 26 corresponds to a concrete embodiment of the memory system. Further, this main memory 720 also corresponds to an example of the first memory in the above-described application mode that the first memory is a nonvolatile memory. Moreover, in the tenth embodiment, the control section 711 of the SSD 710 of FIG. 26 corresponds to an example of the securing section and memory control section in the basic mode. Additionally, the control section 711 also corresponds to an example of the memory control section in the above-described application mode in which data is divided according to an identifier.

Hereafter, the write processing performed in the tenth embodiment illustrated in this FIG. 26 will be explained.

Figure 27:
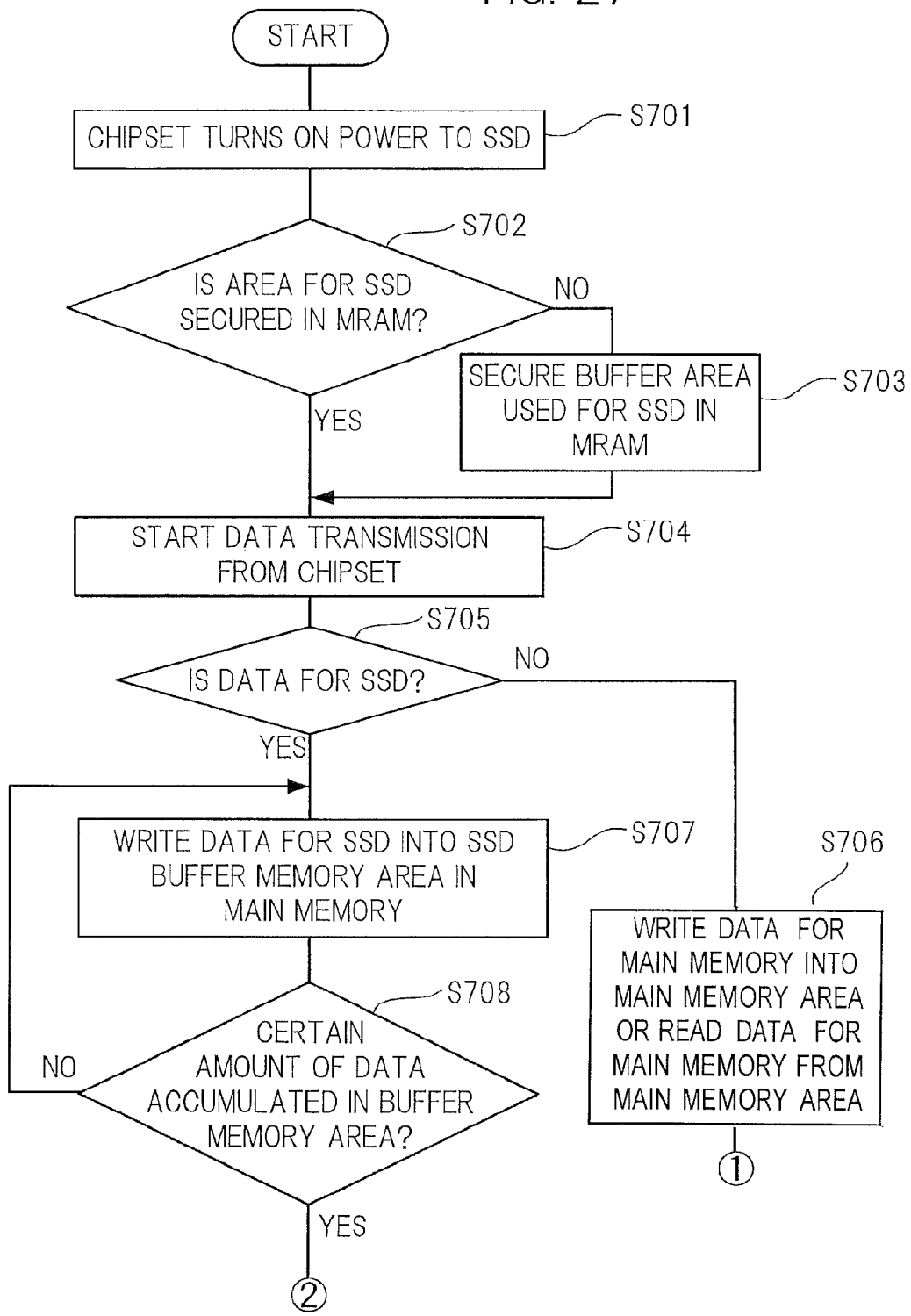
FIG. 27 is a diagram illustrating the first half of the flowchart to express write processing performed in the tenth embodiment.

FIG. 27 is a diagram illustrating the first half of the flowchart to express write processing performed in the tenth embodiment. Also, FIG. 28 is a diagram illustrating the latter half of this flowchart.

Figure 28:
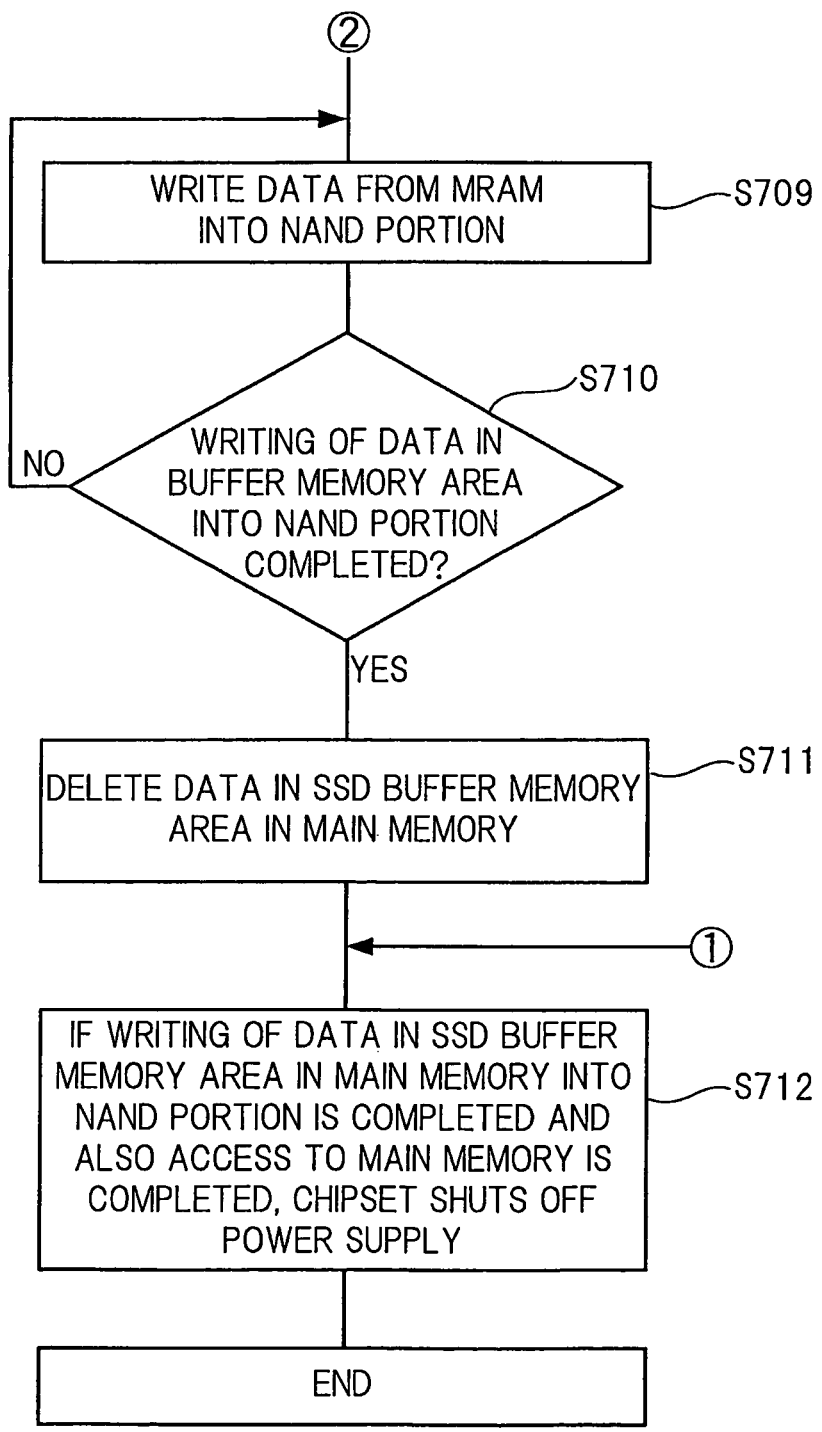
FIG. 28 is a diagram illustrating the latter half of the flowchart to express write processing performed in the tenth embodiment.

When the write processing illustrated in the flowcharts of FIGS. 27, 28 starts, at first the chipset 610 turns on the power of the SSD 710 (step S701).

Then, the control section 711 of the SSD 710 refers to the SPD information of the main memory 720 to determine whether or not the buffer area 721 is secured in the reserve area of the main memory 720 having the MRAM (step S702). If determined that the buffer area 721 is not secured (NO judgment in step S702), the control section 711 secures the buffer area 721 within the reserve area of the main memory 720 (step S703). Further, an address or the like of the secured buffer area 721 is described in the SPD information.

On the other hand, if determined that the buffer area 721 is secured (YES judgment in step S702), the processing of step S703 is omitted to proceed to next step S704.

In this step S704, the chipset 610 starts inputting the data to the SSD 710.

Then, the control section 711 receives the data from the chipset 610, refers to an identifier of the data and determines whether or not the data is the data desirous of holding (step S705).

If determined that it is not the data desirous of holding (NO judgment in step S705), the data is temporary use data. Therefore, in this case, the control section 711 stores the temporary used data into the primary storage area whose location is confirmed by referring to the SPD information (step S706). Moreover, in this step S706, read out of the stored temporary used data from the main memory 720 is also performed. The temporary used data that is read out is transmitted to the CPU 110 via the control section 711 and the chipset 610.

When the processing of this step S706 is finished, the power-off processing (step S712) to be described later is performed.

On the other hand, if determined in the processing of step S705 that the data is the data desirous of holding (YES judgment in step S705), the control section 711 stores the data desirous of holding in the buffer area 721 whose location is confirmed by referring to the SPD information (step S707).

Then, by the control section 711, it is determined whether or not a certain amount of the data desirous of holding is accumulated in the buffer area 721 by the storage of the data desirous of holding this time (step S708).

If determined that the certain amount of the data desirous of holding is not accumulated yet (NO judgment in step S708), the procedure returns to step S707 to perform a next storing of the data desirous of holding. The storage of the data desirous of holding is repeated until when the certain amount of the data desirous of holding is accumulated in the buffer area 721 (YES judgment in step S708).

If the certain amount of the data desirous of holding is accumulated in the buffer area 721, the control section 711 of the SSD 710 reads out the accumulated data desirous of holding from the buffer area 711 and stores into the NAND-type flash memory 621 (step S709).

Subsequently, by the control section 711 of the SSD 710, it is determined whether or not the storage into the NAND-type flash memory 621 is finished for all the certain amount of the data desirous of holding accumulated in the buffer area 721, by the storage of the data desirous of holding this time (step S710).

If determined that the storage is not yet finished (NO judgment in step S710), the procedure returns to step S709 to perform a next storing of the data desirous of holding.

On the other hand, if determined that the storage is finished for all the certain amount of the data desirous of holding (YES judgment in step S710), the control section 711 deletes the data desirous of holding stored in the buffer area 721 (step S711).

When the deletion of the data desirous of holding is finished, subsequently, the control section 711 determines whether or not the storage of the data desirous of holding into the NAND-type flash memory 621 and the access to the main memory 720 are surely completed (step S712). In this step S712, after the confirmation, the chipset 610 shuts off the power of the SSD 710 by the request of the control section 711. In the tenth embodiment, by this shut off the power after the confirmation, it is possible to leave out the storage of the data desirous of holding in the NAND-type flash memory 621 and the access to the main memory 720.

It is needless to say that also by the tenth embodiment explained above, high-speed and power saving are realized at the same time in storing data, like the fourth embodiment.

Next, an eleventh embodiment will be explained.

The eleventh embodiment is different from the tenth embodiment in that the input of the data desirous of holding into the NAND-type flash memory is performed through the buffer area in the main memory having a DRAM. Hereafter, the eleventh embodiment will be explained with a focus on this different point.

Figure 29:
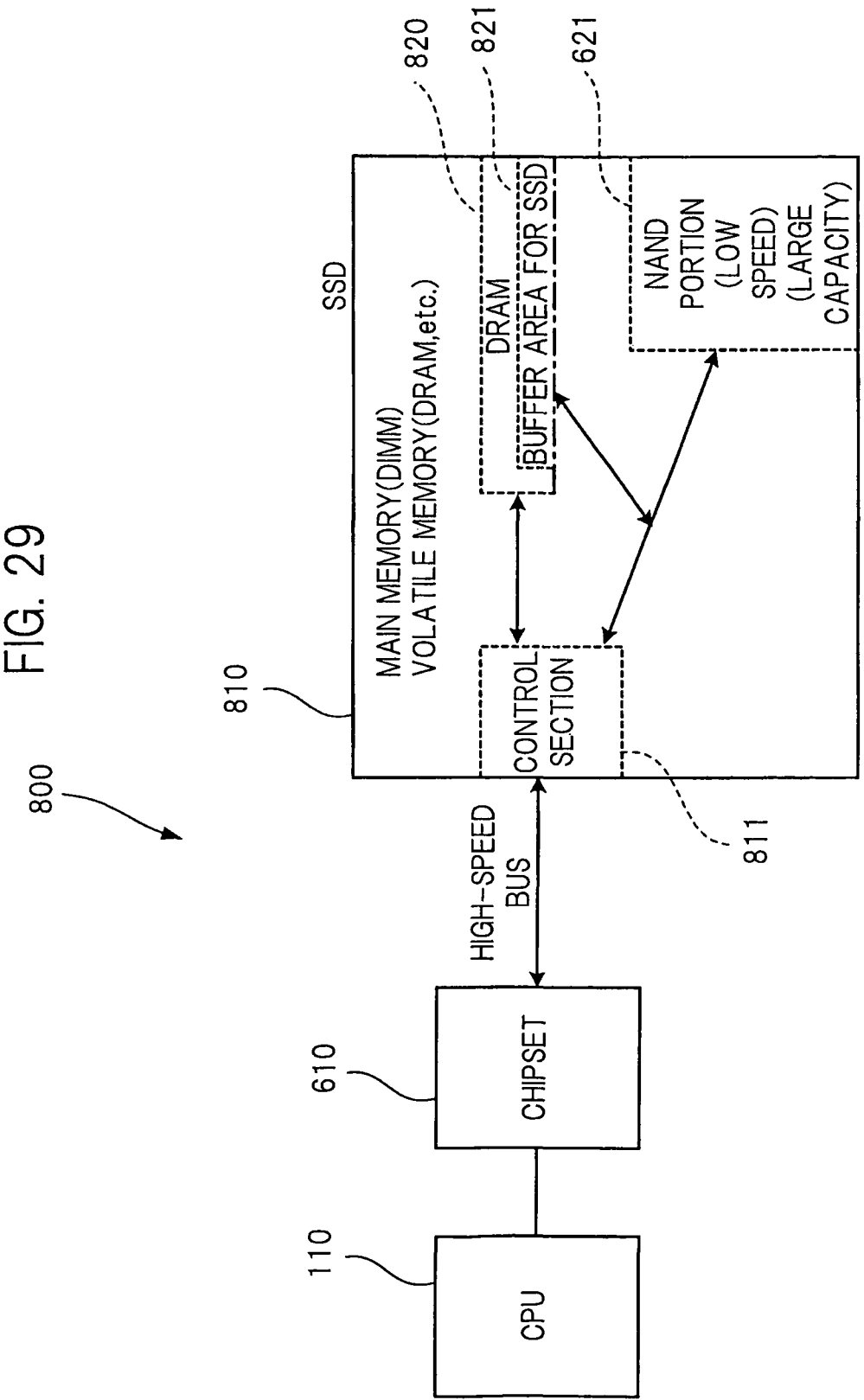
FIG. 29 is a schematic diagram illustrating an eleventh embodiment.

FIG. 29 is a schematic diagram illustrating the eleventh embodiment.

Incidentally, in this FIG. 29, constituent elements that are equivalent to those of FIG. 11 are referred to by the same numerals in FIG. 26. Hereafter, redundant explanation about those equivalent constituent elements is omitted.

In a computer 800 of this FIG. 29, a main memory 820 is different from the tenth embodiment and includes a DRAM. And if an identifier attached to the data indicates the data as the data desirous of holding, a control section 811 of a SSD 810 stores the data desirous of holding into the NAND-type flash memory 621 through a buffer area 821 in the main memory 820.

Furthermore, in the eleventh embodiment, like the tenth embodiment, the shut-off the power of the SSD 810 is performed after surely confirming the completion of the storage of the data desirous of holding into the NAND-type flash memory 621 and the completion of the access to the main memory 820.

In the eleventh embodiment, a combination of the main memory 820 and the SSD 810 of FIG. 29 corresponds to a concrete embodiment of the memory system. Also, in the eleventh embodiment, the SSD 810 of FIG. 29 corresponds to a concrete embodiment of the memory device. Furthermore, in the eleventh embodiment, the control section 811 of the SSD 810 of FIG. 29 corresponds to an example of the control section in the basic mode. Moreover, in the eleventh embodiment, the control section 811 of the SSD 810 of FIG. 29 also corresponds to an example combining the securing section and the memory control section in the basic mode.

Since the write processing in the eleventh embodiment of FIG. 29 is the same as the write processing illustrated in FIG. 25 through FIG. 23, here, explanation on the write processing in this eleventh embodiment is omitted.

It is needless to say that also by the eleventh embodiment explained in the above, high-speed and power saving are realized at the same time in storing data, like the fourth embodiment.

Note that, although a computer is exemplified as a concrete embodiment of the information processing device that is explained about the basic mode, the information processing device is not limited to this. The information processing device may be an electronic device except a computer, for example, such as a portable information terminal, a digital camera or a cellular telephone as long as the device stores data in a SSD or the like.

Further, although a NAND-type flash memory of a SSD is exemplified as an example of the second memory in the basic mode, the second memory is not limited to this. The second memory may be a memory other than the NAND-type flash memory as long as data is stored through a buffer.

Furthermore, in the above-description, although writing and reading of information such as a buffer area for a SSD to secure for the main memory to and from a SPD (information stored in a nonvolatile memory such as EEPROM) is exemplified, this is not limited to the use of SPD.

A method may be employed that stores the information in a nonvolatile memory such as a control section, a chipset or a CPU, and accesses the data.

Moreover, in the above description, although the power-on and power-off of the main memory is performed by the power supply control section, and the power source of the SSD is controlled by the second chipset, these may be entirely controlled by the power source control section or the chipset may perform power-on and power-off of the power source.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A memory system comprising:
a first memory that is used as a main memory of a target device;
a second memory that has an access speed lower than that of the first memory; and
a memory control section that
secures a predetermined area of the first memory as a temporary storage area of the second memory,
secures a remaining area of the first memory as a primary storage area,
determines whether a spare capacity of the primary storage area except a substitute address in a reserve area exceeds a predetermined threshold,
adjusts a buffer area according to a usage situation of the main memory,
receives an instruction to write data into the second memory, and
temporarily stores the data into the temporary storage of the first memory and also transfers the temporarily stored data to the second memory.

2. The memory system according to claim 1, wherein in the first memory, an area other than the predetermined area is used as the main memory.

3. The memory system according to claim 1, further comprising
a third memory that has an access speed higher than that of the second memory, wherein
the memory control section
transfers the data stored in the first memory to the third memory when the temporarily storing of the data into the first memory is completed,
receives an instruction to write data from the third memory into the second memory,
holds a flag as to whether or not transferring of the data into the second memory is finished, and
continues writing the data from the third memory into the second memory when the flag indicates that the transferring is not finished at power-on of a power source.

4. The memory system according to claim 3, wherein the third memory is a nonvolatile memory.

5. The memory system according to claim 1, wherein the first memory is a main memory of an information processing device that performs information processing by using data.

6. The memory system according to claim 1, wherein the first memory is a nonvolatile memory.

7. The memory system according to claim 1, wherein the memory control section also receives an instruction to write data into the first memory, and the data is directly stored into the first memory.

8. The memory system according to claim 7, wherein the memory control section comprises a first input port to which data is inputted and a second input port to which data is inputted, and the data whose input is received by the first input port is handled as data to be written into the first memory and the data whose input is received by the second input port is handled as data to be written into the second memory.

9. The memory system according to claim 7, wherein the memory control section receives input of data with an identifier selected out of a first identifier and a second identifier, and the memory control section handles the data with the first identifier as data to be written into the first memory and handles the data with the second identifier as data to be written into the second memory.

10. A memory device comprising:
a second memory that has an access speed lower than that of a first memory used as a main memory of a target device; and
a processor connected with first memory and the second memory, the processor executing:
securing a predetermined area of the first memory as a temporary storage area of the second memory,
securing a remaining area of the first memory as a primary storage area,
determining whether a spare capacity of the primary storage area except a substitute address in a reserve area exceeds a predetermined threshold,
adjusting a buffer area according to a usage situation of the main memory,
receiving an instruction to write data into the second memory,
temporarily storing the data into the temporary storage area of the first memory, transferring the temporarily stored data to the second memory, and receiving an input of data to be written into the second memory, and transmitting the inputted data.

11. A memory control device comprising:

a processor to execute:

receiving an input of first data and an input of second data;

securing a predetermined area of a first memory used as a main memory of a target device as a temporary storage area of a second memory which has an access speed lower than that of the first memory;

securing a remaining area of the first memory as a primary storage area;

determining whether a spare capacity of the primary storage area except a substitute address in a reserve area exceeds a predetermined threshold;

adjusting a buffer area according to a usage situation of the main memory;

receiving, among the data inputted, with respect to first data, instruction to write the first data into the first memory;

directly storing the first data into the first memory;

and with respect to second data, receiving an instruction to write the second data into the second memory temporarily storing the second data into the temporary storage area of the first memory; and transferring the temporarily stored second data to the second memory.

12. An information processing device, comprising:

a first memory that is used as a main memory of a target device;

a second memory that has an access speed lower than that of the first memory; and a processor executing:

securing a predetermined area of the first memory as a temporary storage area of the second memory securing a remaining area of the first memory as a primary storage area, determining whether a spare capacity of the primary storage area except a substitute address in a reserve area exceeds a predetermined threshold, adjusting a buffer area according to a usage situation of the main memory, receiving an instruction to write data into the second memory, temporarily storing the data into the temporary storage area of the first memory, transferring the temporarily stored data to the second memory, and accessing the first memory and the second memory.

13. The information processing device according to claim 12, further comprising a third memory that has an access speed higher than that of the second memory, and the processor executing:

transferring of the data stored in the first memory to the third memory when the temporarily storing of the data into the first memory is completed.

14. The information processing device according to claim 13, wherein the third memory is a nonvolatile memory.

15. The information processing device according to claim 13, wherein the processor executing:

receiving an instruction to write data from the third memory into the second memory, holding a flag as to whether or not transferring of the data into the second memory is finished, and continuing writing of the data from the third memory into the second memory when the flag indicates that the transferring is not finished at power-on of a power source.

* * * * *

UNITED STATES PATENT AND TRADEMARK OFFICE
CERTIFICATE OF CORRECTION

PATENT NO. : 8,473,675 B2
APPLICATION NO. : 12/805098
DATED : June 25, 2013
INVENTOR(S) : Sadao Miyazaki et al.

Page 1 of 1

It is certified that error appears in the above-identified patent and that said Letters Patent is hereby corrected as shown below:

In the Claims:

Column 35, Line 22, In Claim 11, before "instruction" insert -- an --.

Column 35, Line 26, In Claim 11, delete "memory" and insert -- memory; --, therefor.

Column 36, Line 2, In Claim 12, delete "memory" and insert -- memory; --, therefor.

Signed and Sealed this
Eighth Day of October, 2013

Teresa Stanek Rea
*Deputy Director of the United States Patent and Trademark Office*